US012208997B2

(12) United States Patent
Klapper et al.

(10) Patent No.: US 12,208,997 B2
(45) Date of Patent: Jan. 28, 2025

(54) LOAD TRANSPORT SYSTEM FOR TRANSPORTING A LOAD IN A WORKING SPACE

(71) Applicant: Hans Künz GmbH, Hard (AT)

(72) Inventors: Georg Klapper, Hard (AT); Robert Lang, Innsbruck (AT); Johannes Karl Eberharter, Satteins (AT); Roman Beer, Dornbirn (AT)

(73) Assignee: Hans Künz GmbH, Hard (AT)

( * ) Notice: Subject to any disclaimer, the term of this patent is extended or adjusted under 35 U.S.C. 154(b) by 29 days.

(21) Appl. No.: 17/557,577

(22) Filed: Dec. 21, 2021

(65) Prior Publication Data

US 2022/0194752 A1 Jun. 23, 2022

(30) Foreign Application Priority Data

Dec. 23, 2020 (AT) .................................. A 282/2020

(51) Int. Cl.
*B66C 21/00* (2006.01)
*B66C 13/08* (2006.01)
*B66C 21/08* (2006.01)

(52) U.S. Cl.
CPC .............. *B66C 21/00* (2013.01); *B66C 13/08* (2013.01); *B66C 21/08* (2013.01)

(58) Field of Classification Search
CPC ......... B66C 21/00; B66C 21/02; B66C 21/04; B66C 21/06; B66C 21/08; B66C 21/10;
(Continued)

(56) References Cited

U.S. PATENT DOCUMENTS 2,805,781 A 9/1957 Senn
4,558,790 A * 12/1985 Bruce-Walker ......... B64F 1/125 244/116

(Continued)

FOREIGN PATENT DOCUMENTS

CA 2575354 A1 2/2005
CN 101323420 12/2008

(Continued)

OTHER PUBLICATIONS

Irt Jules Verne—Advanced Technologies for Industry, 4 pages, undated prior art (Jan. 2020).

(Continued)

*Primary Examiner* — Sang K Kim
*Assistant Examiner* — Nathaniel L Adams
(74) *Attorney, Agent, or Firm* — Volpe Koenig

(57) ABSTRACT

A load transport system having a load carrier and at least one load receiving device which for receiving the load is fastened to the load carrier, and at least three positioning cables and at least three suspension devices, each suspension device has at least one positioning cable winch for winding and unwinding one of the positioning cables. The load carrier is suspended from the suspension devices by the positioning cables. The load carrier and the load receiving device fastened thereto are relocatable by activating the positioning cable winches, and the load carrier has at least one multi-cable suspension to which at least two of the positioning cables are connected via cable connectors. Each of the cable connectors is mounted on the multi-cable suspension to be pivotable about at least two pivot axes aligned to be mutually orthogonal, and all pivot axes of the cable connectors intersect in a common intersection point of this multi-cable suspension.

14 Claims, 14 Drawing Sheets

(58) Field of Classification Search
CPC ...... B66C 13/06; B66C 13/08; B25J 17/0266; F16M 11/123
See application file for complete search history.

(56) References Cited

U.S. PATENT DOCUMENTS

| | | | | |
|---|---|---|---|---|
| 4,710,819 | A * | 12/1987 | Brown | F16M 13/00 348/157 |
| 6,826,452 | B1 | 11/2004 | Holland et al. | |
| 6,840,127 | B2 * | 1/2005 | Moran | G09B 9/46 414/735 |
| 10,369,693 | B1 | 8/2019 | Levine et al. | |
| 2008/0121601 | A1 * | 5/2008 | Ehrenleitner | B66C 1/20 212/76 |
| 2013/0109484 | A1 * | 5/2013 | Fisher | A63J 5/00 212/270 |
| 2015/0217975 | A1 * | 8/2015 | Khajepour | B66C 21/00 254/292 |

FOREIGN PATENT DOCUMENTS

| | | | |
|---|---|---|---|
| CN | 103117075 | A | 5/2013 |
| DE | 102009050729 | | 4/2011 |
| DE | 102020130409 | | 5/2022 |
| SU | 557988 | | 5/1977 |
| SU | 1532530 | A1 | 12/1989 |
| WO | 2006047798 | | 5/2006 |
| WO | 2020/198862 | A1 | 10/2020 |

OTHER PUBLICATIONS

Hoist Concept 1, 1 page, undated prior art (Jan. 2020).
Hoist Concept 2, 1 page, undated prior art. (Jan. 2020).
Hizook (robotics news for academics and professionals), Stadium-Sized 3d Printers using Winch Robots, 3 pages, www.hizook.com/blog/2014/07/15/stadium-sized-3d-printers, Feb. 13, 2018.
Song et al., "Research on key technologies for installation and maintenance of reflector of FAST", 2020 National Astronomical Observatories, CAS and IOP Publishing Ltd., Research in Astronomy and Astrophysics 2020 vol. 20 No. 5, 66 (6pgs), hup://www.raa-journal.org hap://iopscience.iop.org/raa, Received Apr. 1, 2019; accepted Jun. 17, 2019.
Gagliardini, et al., "Optimal Design of Cable-Driven Parallel Robots for Large Industrial Structures", Proceedings—IEEE International Conference on Robotics and Automation, https://www.researchgate.net/publication/263714205, 7 pages, May 2014.
Russian Office Action dated Oct. 17, 2022 for Russian Patent Application No. 2021138141.

* cited by examiner

LOAD TRANSPORT SYSTEM FOR TRANSPORTING A LOAD IN A WORKING SPACE

INCORPORATION BY REFERENCE

The following documents are incorporated herein by reference as if fully set forth: Austrian Patent Application No. A282/2020, filed Dec. 23, 2020.

TECHNICAL FIELD

The invention relates to a load transport system for transporting a load in a working space, wherein the load transport system has a load carrier and at least one load receiving device which for receiving the load is fastened to the load carrier, and at least three positioning cables and at least three suspension devices that are disposed so as to be mutually spaced apart, wherein each suspension device has at least one positioning cable winch for winding and unwinding one of the positioning cables, and the load carrier by means of the positioning cables is suspended from the suspension devices, wherein the load carrier and the load receiving device fastened thereto are able to be relocated in and/or above the working space by activating the positioning cable winches.

BACKGROUND

In load transport systems of this type the load carrier by means of positioning cables is suspended from suspension devices that are spatially distributed and disposed so as to be mutually spaced apart. The load carrier can be moved back and forth in a region between the suspension devices by winding and unwinding the positioning cables in a corresponding manner on the respective positioning cable winches, so as to be able to transport loads that are suspended from the load receiving device and thus from the load carrier from one place to another in the region between the suspension devices.

A load transport system of the generic type is shown in DE 10 2009 050 729 A1. A platform which is capable of carrying a load and has a rectangular footprint is provided there as a load carrier. The positioning cables are fastened to the respective corners of this platform. Gripping tools fixed on the platform are provided as the load receiving device in DE 10 2009 050 729 A1.

An issue in the technology shown in DE 10 2009 050 729 A1 lies in that in a central region between the suspension devices the loads which are fastened to the load carrier, or to the load receiving device, respectively, can indeed be very easily gripped and transported but the working space of the load transport system in which loads can be transported is more or less limited to this central region between the suspension devices. In the prior art it is difficult and, from a certain distance from the central region practically impossible, to receive and transport loads by the load receiving device. At the peripheries, thus close to the suspension device, sagging arises in the positioning cables and the platform used as the load carrier in the prior art is difficult to control at said peripheries.

SUMMARY

It is therefore an object of the invention to improve a load transport system of the type mentioned above with a view to the working space between the suspension devices being as large as possible.

To this end, the invention proposes that the load carrier has at least one multi-cable suspension by means of which at least two of the positioning cables are in each case connected to the load carrier by way of one cable connector, wherein each of the cable connectors is mounted on the multi-cable suspension so as to be pivotable about at least two pivot axes aligned so as to be mutually orthogonal, and all pivot axes of the cable connectors intersect in a common intersection point of this multi-cable suspension.

All pivot axes here preferably always, thus in other words in any arbitrary operating position of the load carrier, meet in the common intersection point of this multi-cable suspension.

As a result of this multi-cable suspension, a particularly large operating space between the suspension devices can be achieved. The multi-cable suspension permits the load carrier to be moved in a targeted manner to the position where the latter is required for lifting or depositing the load even in peripheral regions of the space between the suspension devices. As a result of the use of multi-cable suspensions of the type mentioned on the load carrier, the latter can also be very positively controlled in the mentioned peripheral regions. Above all, uncoupling between a load swaying on the load carrier and the positioning cables is also achieved as a result of the use of such multi-cable suspensions on the load carrier. Swinging of the positioning cables does not arise, or at least does not arise that fast, when the load suspended from the load receiving device swings or oscillates, respectively. The use of such multi-cable suspensions is particularly favorable when the load carrier is suspended from four, five, six or more positioning cables and thus also from a corresponding number of suspension devices.

The working space is the space between the suspension devices in which the load fastened to the load receiving device, or received by the load is receiving device, respectively, can be transported from one location to another by the load transport system.

The term cable is to be understood in general terms. Here, this is an elongate flexible element which can be stressed for tension and is able to be wound onto a winch. The cable can in each case be a cable in the more concise sense, for example a steel cable, or else a belt or a chain or the like. For the sake of linguistic simplicity, this collectively is included in the term cable. The same applies in an analogous manner to the positioning cables as well as to the lifting cables and activating cables yet to be mentioned hereunder.

The respective cable can be embodied as a single cable. Accordingly, the singular is also substantially used here for the cable. Of course, the respective cable which for the sake of linguistic simplicity is also referred to in the singular may also be implemented by a plurality of cables which in particular run in a mutually parallel manner, or by a cable pack. Moreover, it is likewise possible for individual or a plurality of the cables to be deflected or embodied, respectively, in the form of a tackle, for example. In the context of the invention, the latter can in each case be adapted to the respective tasks and to the specific loads to be considered. This also applies to the positioning cables as well as to the lifting cables and activating cables yet to be mentioned hereunder.

The load carrier is the part on which the positioning cables by way of the end thereof that faces away from the respective suspension device engage in each case. The load carrier by means of the positioning cables thus is suspended from the suspension devices. The load carrier can be relocated in or above the working space by activating the positioning cable winches, thus in other words by winding or unwinding the respective positioning cable in a corresponding manner onto or from the respective positioning cable winch. It is obvious here that it is typically necessary for all positioning cables to be wound or unwound in order for the load carrier to be moved. This, however, is known per se in the prior art and does not need to be explained in more detail.

The load receiving device is the part of the load transport system that serves for fastening the load to the load carrier. This can be, for example, a hook or a mechanical or magnetic grip, a shovel or the like, depending on the type of load that is to be transported by means of the load transport system. If the loads are individual objects, a hook or a gripping device is often expedient as a corresponding load receiving device. However, if the load to be transported is bulk material such as, for example, gravel or sand, the load receiving device can thus be a shovel, a gravel loader or the like. If the load is a liquid, the load receiving device can be, for example, a corresponding vessel in which the liquid can be received. The implementation of the invention here has no strict limits. Practically all load receiving devices which are known in the prior art and suitable for the respective field of application can be used for implementing the invention.

Load transport systems according to the invention may also be referred to as robotic cables.

Load transport systems according to the invention have at least three positioning cables and accordingly also at least three suspension devices that are disposed so as to be mutually spaced apart. The invention however is particularly well implemented when the load transport system has more than three positioning cables, thus four, five or six positioning cables, for example, and a corresponding number of suspension devices. The suspension devices are favorably but not mandatorily set up so as to be uniformly spaced apart, for example such that said suspension devices in a plan view are in each case disposed in the corners of an inherently closed polygonal line. In the case of three suspension devices, the latter is a triangle, in the case of four suspension devices a quadrangle, preferably a square or a rectangle, in the case of five suspension devices a pentagon, etc.

The suspension devices are the devices from which at least one of the positioning cables is in each case suspended. In order for the suspension devices to be configured, suspension possibilities already existing in the respective terrain, or in the respective region, respectively, in which the load transport system is to operate, can be utilized. In the case of buildings, for example, the suspension possibilities may be already existing walls, or in the case of a natural topography, rock faces, rock protrusions or other points which are preferably disposed so as to be elevated in relation to the environment. It can however also be provided that at least one, preferably all, of the suspension devices has/have at least one mast or tower, wherein the positioning cable winch and/or a return pulley for the positioning cable suspended from the respective suspension device is disposed on the mast or the tower. It is possible here for the positioning cable winch to be disposed on an elevated or else the highest point of the mast or the tower. In this case, return pulleys for the respective positioning cable on the respective suspension device can optionally be dispensed with. It is however also possible for the positioning cable winch to be disposed further down on the respective suspension device. In this instance it is typically favorable for the positioning cable to be guided by way of a return pulley of the suspension device that is disposed above the positioning cable winch on the respective suspension device. The suspension devices can be configured so as to be stationary, thus fixed in the respective hard ground, or else so as to be movable. Said suspension devices can be designed, for example as in the prior art mentioned at the outset, on mobile support structures, or so as to be relocatable from one position to another in another manner. It can be provided that the respective suspension device is anchored in the hard ground, or only set up on the respective hard ground. The suspension devices can have compression members as well as tie bars. In the case of the compression members it can be provided that the latter stand on the hard ground only by way of pressure-introduction faces, optionally only secured against lateral slippage. The tie bars can be anchored in the hard ground or have a base which is equipped with a suitable weight for receiving the respective tensile forces and is only deposited on the hard ground. The base can be a fixed member such as, for example, a concrete member, or else a container which can be filled with water or other liquids or bulk material. The latter has the advantage that the base in the unfilled state is able to be transported in a relatively easy and thus ready manner.

There are various possibilities when multi-cable suspensions are used. It can thus be provided, for example, that all positioning cables by means of the multi-cable suspension are in each case connected to the load carrier by way of one cable connector, wherein each of the cable connectors is mounted on the multi-cable suspension so as to be pivotable about at least two pivot axes aligned so as to be mutually orthogonal, and all pivot axes of the cable connectors intersect in a common intersection point of this multi-cable suspension. Here too, it is preferably provided that all pivot axes of the cable connectors intersect always, thus in any arbitrary operating position, in the common intersection point of the multi-cable suspension.

In another group of design embodiments of the invention it can, however, also be provided that the load carrier has an elongate support beam, and the multi-cable suspension is disposed on the support beam, preferably on one end of the support beam. In such design embodiments it can be provided, for example, that the load carrier has a single-cable suspension by means of which a single other one of the positioning cables is connected to the load carrier, wherein the single-cable suspension is disposed on the support beam so as to be spaced apart from the multi-cable suspension, preferably on an end of the support beam that is opposite the multi-cable suspension. However, it is also possible for the load carrier to have at least one further multi-cable suspension by means of which at least two other ones of the positioning cables are connected to the load carrier, wherein the multi-cable suspensions are disposed on the support beam so as to be mutually spaced apart, preferably on mutually opposite ends of the support beam. In other words, it is thus also possible for the positioning cables to be fastened to the load carrier in groups by way of a corresponding number of multi-cable suspensions. The further multi-cable suspensions here can be embodied like the multi-cable suspensions already described. It is thus in particular possible for the at least two other ones of the positioning cables by means of the further multi-cable suspension to be in each case connected to the load carrier by way of one further cable connector, wherein each of the further cable connectors is mounted on the further multi-cable suspension so as to be pivotable about at least two pivot axes aligned so as to be mutually orthogonal, and all pivot axes of the further cable connector intersect in a common intersection point of this further multi-cable suspension.

It is preferably provided that the cable connectors are in each case configured as elongate and/or inherently rigid members. In order for an ideally large pivot angle of the cable connectors to be achieved, particularly preferred variants provide that the cable connectors are configured so as to be L-shaped or C-shaped. It is in any case favorable for the respective positioning cable to be fastened to a first end of the respective cable connector, and for the cable connector by way of a second end that is opposite the first end to be pivotably mounted on the multi-cable suspension.

The multi-cable suspensions can be of different designs. For example, it can thus be provided that at least two of the cable connectors by means of at least two, mutually orthogonal, axle pins are mounted on the multi-cable suspension so as to be pivotable about at least two pivot axes aligned so as to be mutually orthogonal. It is preferably provided here that the respective cable connector on a first one of the axle pins is mounted so as to be pivotable about a first one of the pivot axes, and the first one of the axle pins by way of the second one of the axle pins is mounted so as to be pivotable about a second one of the pivot axes. In particularly preferred embodiments, even a third pivot axis can be implemented, for example in that the first one of the axle pins and the second one of the axle pins are pivotably mounted in a yoke, wherein the yoke is pivotable or rotatable, respectively, about the third pivot axis. In this instance, all three pivot axes here favorably intersect in the common intersection point of the multi-cable suspension.

Another design embodiment for the multi-cable suspension provides that the multi-cable suspension for each of the cable connectors pivotably mounted thereon has a guide in the shape of an arcuate segment, on which the respective cable connector is guided for pivoting about a first one of the orthogonal pivot axes, and the guides in the shape of arcuate segments, for pivoting the respective cable connectors about a second one of the pivot axes aligned so as to be mutually orthogonal, are pivotable about a common axle pin. These variants of a multi-cable suspension are particularly favorable when four, five, or more positioning cables have to be connected to the load carrier.

In the implementation of the invention, the fastening of the load receiving device to the load carrier can in principle be embodied as is known in the prior art.

In the context of the object mentioned at the outset of achieving an ideally large operating space between the suspension devices, particularly preferred design embodiments of the invention however provide that the load transport system has a lifting cable winch and a lifting cable, wherein the lifting cable is able to be wound onto and unwound from the lifting cable winch, and the load receiving device by means of the lifting cable is suspended from the load carrier and is able to be lifted and lowered relative to the load carrier.

By suspending the load receiving device from the load carrier by means of the lifting cable and the possibility of lifting the load receiving device relative to the load carrier by means of the lifting cable and of lowering said load receiving device from said load carrier, the working space of the load transport system is additionally enlarged in comparison to the prior art, in particular in the peripheral regions in the direction toward the respective suspension devices. Loads can also be transported in a safe and controlled manner by way of the load transport system in a peripheral region between the suspension devices.

A further advantage lies in that the load transport system can also be better used in terrain surfaces having a pronounced surface topography, or an inconsistent relief, thus in areas in which hills or other elevations and/or valleys and/or other terrain depressions are configured between the suspension devices. In load transport systems according to the prior art, specific regions between the suspension devices cannot be reached in the first place by means of the load receiving device in the case of a very inconsistent relief, or an intense surface topography, respectively. The suspension of the load receiving device that is able to be lifted or lowered by means of the lifting cable on the load carrier however makes it possible for loads to be transported between different positions without significant restrictions even in the case of an inconsistent surface topography, or an intense surface relief, respectively.

In order for the positioning cable to run onto the positioning cable winch, or run off from the latter, respectively at an ideally optimal angle, thus ideally at an orthogonal angle, preferred variants of the embodiment provide that the positioning cable winch(es) is/are in each case disposed so as to be pivotable on the respective suspension device. This here can be a free pivoting capability in which the tension on the positioning cable ensures corresponding pivoting of the positioning cable winch. It can however also be provided that the positioning cable winch(es) is/are configured so as to be pivotable in a motorized manner. In these design embodiments, a drive such as, for example, a motor and/or a corresponding transmission, ensures targeted pivoting of the positioning cable winch in order for the latter to be aligned for the positioning cable to run in or off, respectively, in an optimal manner. The pivoting capability of the positioning cable winch is particularly favorable when no return pulley is present on the respective suspension device in the first place, the positioning cable thus running directly from the positioning cable winch to the load carrier. However, if a corresponding return pulley for the positioning cable is present on the suspension device, it is favorable in this instance for the positioning cable winch to be correspondingly pivotable, preferably in a motorized manner, when the return pulley is disposed so as to be relatively close to the positioning cable winch. The pivotable arrangement can however be implemented not only in the positioning cable winch but in an analogous manner also in the lifting cable winch and in an activating cable winch which is optionally present for an activating cable yet to be mentioned, in order for the mentioned advantages to be achieved in a correspondingly adapted form also there.

Preferred variants provide that the load receiving device has at least one return pulley for diverting the lifting cable. It can be provided, in particular while utilizing this return pulley, for example, that the lifting cable between the load carrier and the load receiving device is guided by way of a tackle in order to be able to achieve greater forces, in particular when lifting the load disposed on the load receiving device. In the configuration of a tackle, the cable forces arising in the lifting cable are also decreased in accordance with the quotient resulting from the reeving. As a result, the lifting cable can be embodied so as to be lighter and thinner. The equilibrium of the forces of the positioning cables is thus influenced to a lesser extent. At the same time, an enlargement of the working space is also achieved as a result, because the load carrier can thus be moved closer to that suspension device that lies diagonally opposite the suspension device having the lifting cable winch.

In a first group of design embodiments, the lifting cable winch can be disposed on one of the suspension devices. The load carrier in this instance can have a deflection pulley, wherein the lifting cable from the lifting cable winch is guided to the load receiving device by way of the deflection pulley. As has already been explained above in the context of the positioning cable winch, the lifting cable winch can be configured so as to be pivotable, preferably so as to be disposed on the suspension device. Here too, a free pivoting capability or a motorized pivoting capability of the lifting cable winch is possible. Here too, this pivoting capability can be utilized so that the lifting cable always runs onto the lifting cable winch, or is unwound from the latter, at an ideally orthogonal angle.

Alternatively, and in another group of design embodiments, the lifting cable winch can however also be disposed on the load carrier. To this end, it can be provided that an electric power supply line for supplying a drive motor of the lifting cable winch with electric power is integrated in at least one of the positioning cables. It is likewise possible that this power supply line is guided to the lifting cable winch as a separate line. In the case of the integration in one of the positioning cables, technologies which are known per se can be resorted to. The power supply line, or the power supply lines, can thus be intertwined in the respective positioning cable as electrically conducting strands which are electrically insulated toward the outside. Combined variants in which the power supply line, or the power supply lines, respectively, over a partial distance is/are integrated in the positioning cable and over another partial distance is/are guided to the lifting cable winch as a separate line.

The load receiving device can be configured as an inherently rigid component such as, for example, as a load hook. In other design embodiments, the load receiving device can however also have an activatable actuator. The latter can be configured for fastening the load to the load receiving device, for example. This actuator can in principle be driven by a local motor. Preferred variants however provide that at least one activating cable of the load transport system for activating the actuator is preferably guided to the load receiving device by way of the load carrier. This here can be an activation cable or a plurality of activation cables. The latter can actuate one or a plurality of actuators, or potentially also a plurality of functions of one actuator.

The positioning cables favorably run in vertical planes between the respective suspension device and the load carrier, while taking into account their respective slack. These vertical planes are thus defined by the respective positioning cable. If lifting cables and/or activating cables and/or power supply lines have also to be guided from the load carrier to the suspension device, it is thus preferably provided that the lifting cable and/or the activating cable and/or the power supply line are/is guided in the same vertical plane as the positioning cable guided between the respective suspension device and the load carrier. It is obvious here that the respective vertical plane is displaced when the positioning cable defining said plane changes its profile when the load carrier moves.

BRIEF DESCRIPTION OF THE DRAWINGS

Further features and details of preferred design embodiments of the invention will be explained in an exemplary manner in the description of the figures hereunder in which.

DETAILED DESCRIPTION

Figure 1:
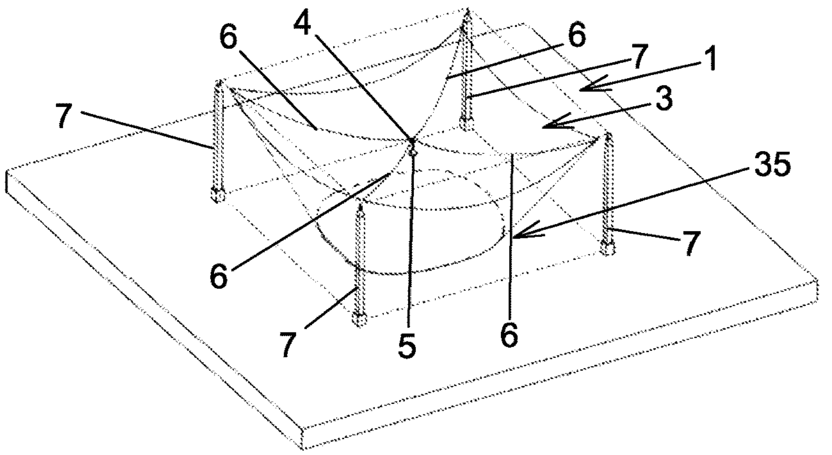
FIG. 1 shows a schematic illustration pertaining to the size of the working space of a load transport system according to the prior art.

The load transport system according to the prior art illustrated in FIG. 1 has four suspension devices 7 which are configured in the form of masts. positioning cables 6 being in each case suspended therefrom. All of the positioning cables 6 run from the respective suspension device 7 to the load carrier 4. In the prior art, the load receiving device 5 which here is embodied as a hook is fixed directly to the load carrier 4. The load carrier 4 together with the load receiving device 5 can be moved in the region between the suspension devices 7 by winding the positioning cables 6 onto the respective positioning cable winches 8 (not illustrated here) and unwinding said positioning cables 6 from the latter in order for loads 2 to be received, to be transported to another location, and to be deposited again on the surface 35 of the terrain. In the prior art, the load carrier 4 together with the load receiving device 5 here has to be transported directly to the load in order for the load to be able to be fastened to the load receiving device 5 and transported to another location. The same applies for the depositing of the load 2 at another location. The working space 3 here describes the sub-region, or the sub-volume, respectively of the overall volume between the suspension devices 7 in which a load by means of the load carrier 4 and the load receiving device 5 can be received and transported to another location.

In the prior art in which the load receiving device 5 is fixedly fastened to the load carrier 4, the working space 3 schematically illustrated in FIG. 1 is limited to a central region. Sub-regions outside this central region cannot be reached by the load carrier 4 and the load receiving device 5 in order for loads 2 to be received or loads 2 to be deposited there. The working space 3 in the prior art, indicated in FIG. 1, in the direction of the surface 35 increasingly tapers in the direction of the center between the suspension devices 7.

When the load carrier 4 with the load receiving device 5 in the prior art is moved into the peripheral regions of the space between the suspension devices 7, states which are no longer able to be managed and also no longer able to be controlled and calculated arise in the prior art due to sagging regions of the positioning cable 6 and due to tilting of the load carrier 4 caused by suspension from the positioning cables 6 such that the working space 3 in the prior art, as illustrated in FIG. 1, is indeed limited to a central region between the suspension devices 7.

Figure 2:
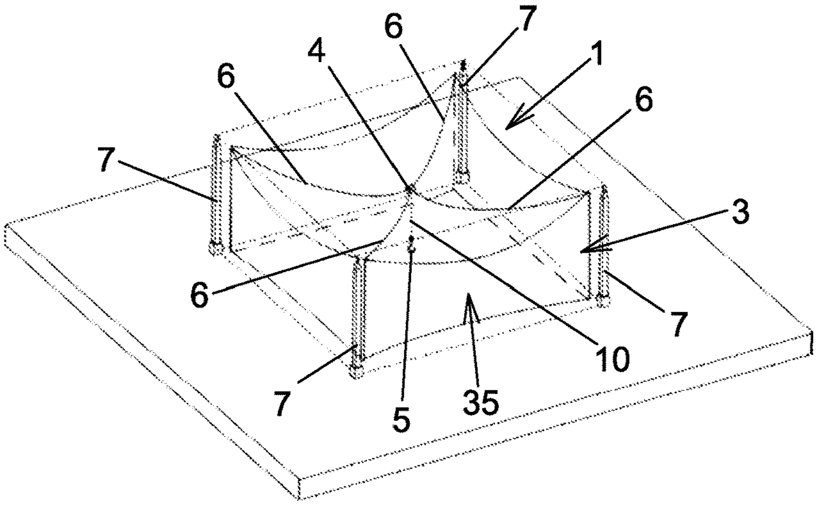
FIG. 2 shows a schematic illustration pertaining to the size of the working space in a load transport system according to the invention.

FIG. 2 now shows in a schematic manner how the load receiving device 5, in a construction which otherwise is identical to that in FIG. 1, by means of a lifting cable 10 is suspended from the load carrier 4, wherein the load receiving device 5 is able to be lifted and lowered relative to the load carrier 4 by winding the lifting cable 10 onto a lifting cable winch 9 (not illustrated here) or unwinding said lifting cable 10 from the latter. This leads to a substantial enlargement of the working space 3, as is illustrated in FIG. 2. In the case of the invention as illustrated in FIG. 1, the working space 3 is no longer limited to a central region, rather reaching much farther into peripheral regions close to the suspension device 7 in comparison to the prior art. The load carrier 4 can be disposed in a relatively high position above the surface 35, in particular in the peripheral regions, by correspondingly winding and unwinding the positioning cables 6. A load 2 lying in this peripheral region can still be reached and received by the load carrier 4, or correspondingly still deposited in these peripheral regions, by lowering the load receiving device 5 by means of the lifting cable 10. Of course, this here is not limited to the highly schematic arrangement in FIG. 2, having four suspension devices 7 and accordingly four positioning cables 6. As has been mentioned at the outset, the invention can also be implemented for load transport systems 1 having only three positioning cables 6 and accordingly also only three suspension devices 7, but above all also having more than three, thus four, five or six, etc., positioning cables 6 and suspension devices 7. When viewed in a plan view of the surface 35, the suspension devices 7 here favorably stand in the corners of an imaginary closed polygonal line, the latter in the case of three suspension devices 7 indeed being a triangle, in the case of four suspension devices 7 preferably being a rectangle or a square, generally a polygon, in the case of five suspension devices 7 being a pentagon, etc.

A measure according to the invention for designing the working space 3 between the suspension devices 7 so as to be as large as possible, provides that the load carrier 4, as has already been explained at the outset, has at least one multi-cable suspension 20 as will be explained once again hereunder by means of the exemplary embodiments. By using such multi-cable suspensions 20, the load carrier 4 can be moved far better into the peripheral regions close to the suspension device 7 without states that are difficult to manage or control arising here. These multi-cable suspensions 20 in the case of the load 2 oscillating on the load carrier 4 also ensure uncoupling however, such that the positioning cables 6 as a result of the oscillation of the load 6 are not likewise set in oscillation.

A further advantage of load transport systems 1 according to the invention in comparison to the prior art becomes evident when the surface 35 of the terrain is not flat but has a correspondingly rough topography, or a correspondingly rough relief having elevated regions and depressions or valleys. In particular in the case of such demanding characteristics of the surface 35 of the terrain, the entire available space by means of load transport systems 1 according to the invention can be much better accessed and thus utilized by the load receiving device 5 in order for loads 2 to be received or deposited there than in the prior art.

Figure 3:
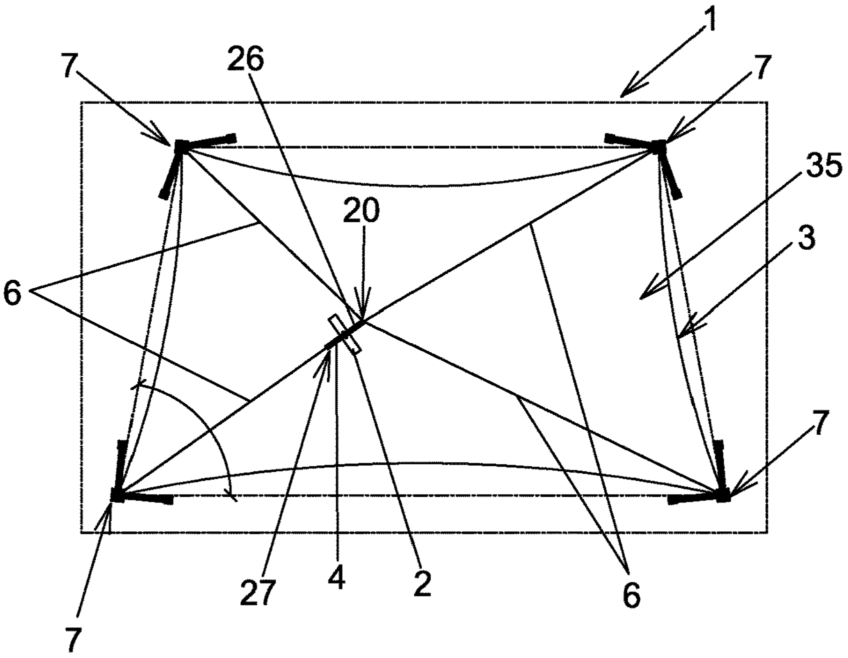
FIGS. 3 to 8 show schematic overall views pertaining to an embodiment according to the invention of a load transport system.

FIGS. 3 to 8 now show a first exemplary embodiment of a load transport system 1 according to the invention in schematic overall views. FIG. 3 shows a plan view. FIGS. 4 to 8 schematically show in perspective views from obliquely above how a load 2 at a first position within the working space 3 by means of the load receiving device 5 is received, transported to another location within the working space 3, and there is deposited again on the surface 35 of the terrain. The load transport system 1 which is shown in FIGS. 3 to 8 has four suspension devices 7, configured in the form of mast assemblies, and a corresponding number of positioning cables 6. The load carrier 4 by means of the positioning cables 6 is suspended from the suspension devices 7. Each suspension device 7 has a positioning cable winch 8 for winding and unwinding the respective positioning cable 6. The positioning cable winches 8 are not explicitly illustrated in FIGS. 3 to 8. In terms of potential design embodiments, reference to this end is however made to the detailed explanations by means of FIGS. 26 to 32 further below. In the exemplary embodiment according to FIGS. 3 to 8 shown here, the positioning cables 6 from the positioning cable winch 8 are in each case guided by way of a return pulley 13 on the respective suspension device 7. Three of the positioning cables 6 are fastened by way of a multi-cable suspension 20 and a support beam 26 of the load carrier 4, said support beam 26 being provided in this first exemplary embodiment. The fourth positioning cable 6 is fastened to the load carrier 4, or the support beam 26 thereof, respectively, by way of a single-cable suspension 27. Reference to various examples pertaining to how such load carriers 4 can be specifically implemented will be made further below by means of the following figures.

In this exemplary embodiment, it is in any case also provided that the load receiving device 5, here embodied as a hook, is suspended from the load carrier 4 by means of a lifting cable 10 and is thus able to be lifted and lowered relative to the load carrier. The lifting cable 10 is able to be wound onto a lifting cable winch 9. The lifting cable winch 9 in this first exemplary embodiment is situated on one of the suspension devices 7, as this is specifically shown in FIG. 27 and explained further below, for example. The lifting cable 10 is preferably guided along one of the positioning cables 6 to the corresponding suspension device 7. Each of the positioning cables 6 by way of the slack thereof defines a vertical plane 36. These vertical planes 36 are indicated in an exemplary manner in FIGS. 4 and 8 and omitted for the sake of clarity in FIGS. 5 to 7. The lifting cable 10 in preferred design embodiments such as that shown here runs in the vertical plane 36, the latter being defined by the positioning cable 6 which is guided to the same suspension device 7 as the lifting cable 10.

Figure 4:
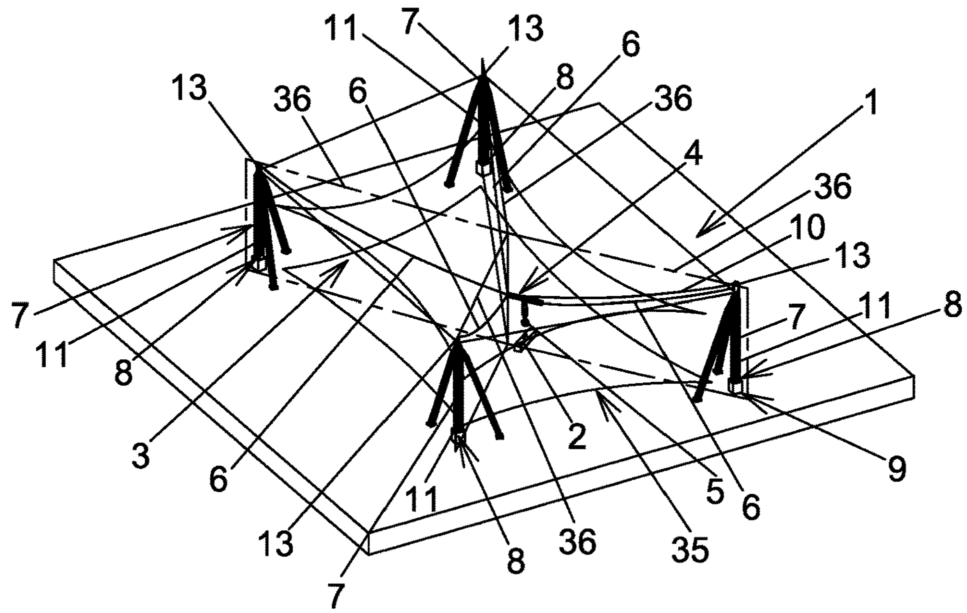
Figure 8:
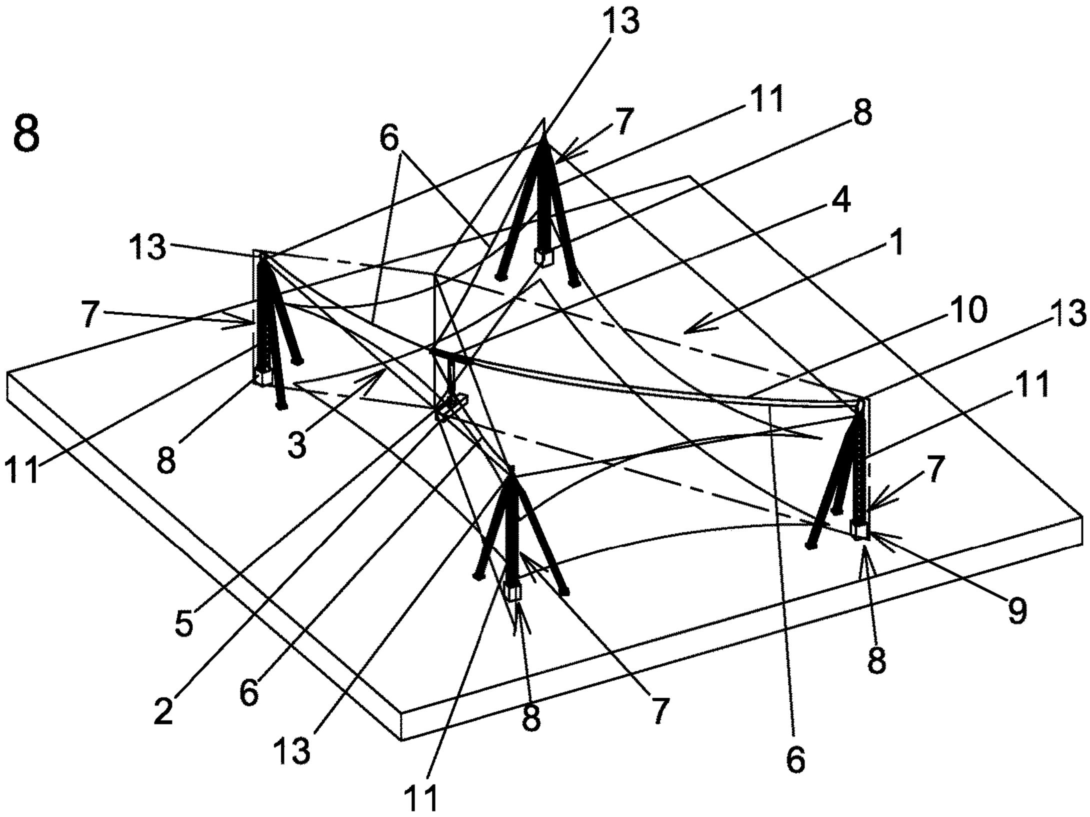

The working space 3 of this load transport system 1 is illustrated with dashed lines in FIGS. 3, 4 and 8. Said working space 3 is not indicated for reasons of clarity in FIGS. 5, 6 and 7.

Figure 5:
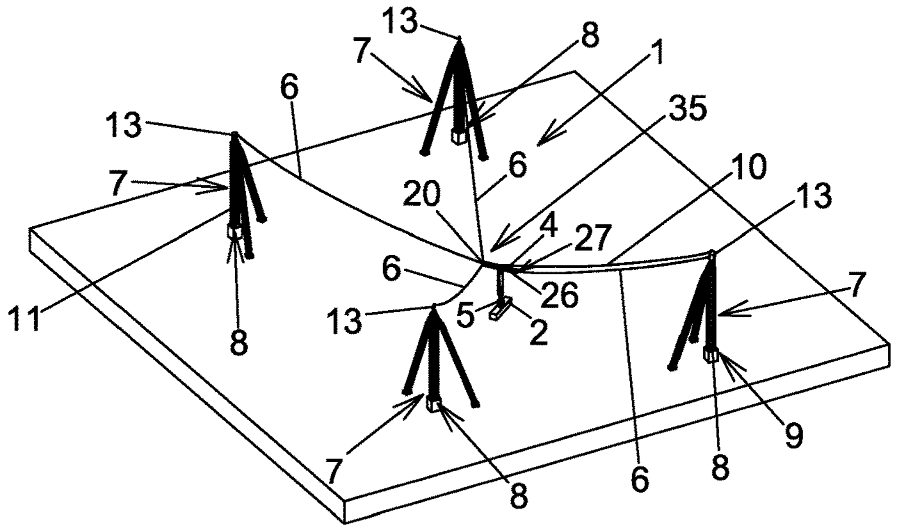
Figure 6:
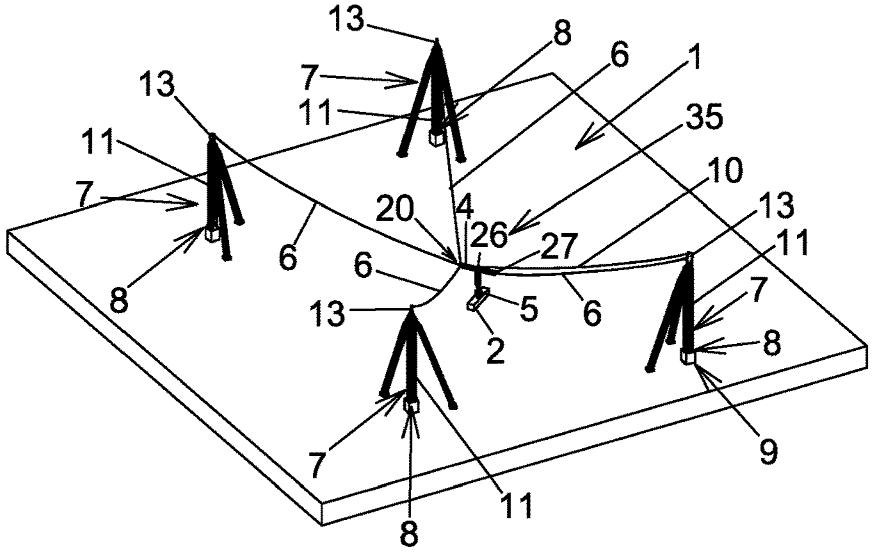
Figure 7:
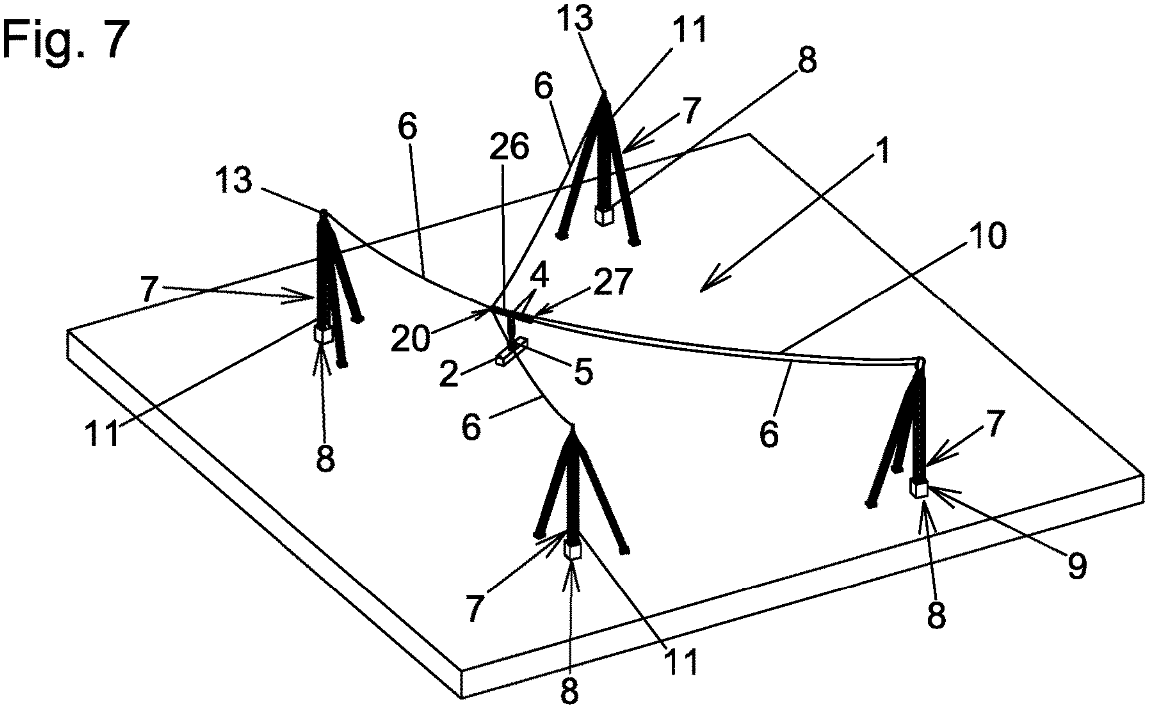

The load carrier 4 by correspondingly winding the positioning cables 6 onto the respective positioning cable winches 8 thereof, or unwinding said positioning cables 6 therefrom, respectively, has now been relocated in, or above, respectively, the working space 3 in FIG. 4 such that the load receiving device 5, which here is configured as a hook, is situated above the load 2. In order for the load 2 to be able to be received by the load receiving device 5, the load receiving device 5 by means of the lifting cable 10 is lowered from the load carrier 4 so far until said load receiving device 5 can be hooked to the load 2. This state is shown in FIG. 5. Subsequently, the load receiving device 5 together with the load 2 suspended therefrom is lifted, this being illustrated in FIG. 6. In order for the load 2 now to be moved to a new position within the working space 3, the positioning cables 6 are correspondingly wound onto the respective positioning cable winches 8 thereof, or unwound therefrom, respectively, as a result of which the load carrier 4 together with the load receiving device 5 and the load 2 suspended therefrom is relocated to a new position, as is illustrated in an exemplary manner in FIG. 7. The load carrier 4 here can be situated within or else above the working space 3. In order for the load 2 to now be deposited on the surface 35 of the terrain at this new position in the working space 3, the load receiving device 5 together with the load 2 suspended therefrom is lowered from the load carrier 4 by means of the lifting cable 10, this being illustrated in FIG. 8. The load receiving device 5 can subsequently be separated from the load 2 so that a next operating procedure can be carried out by means of the load carrier 4 and the load receiving device 5.

Figure 9:
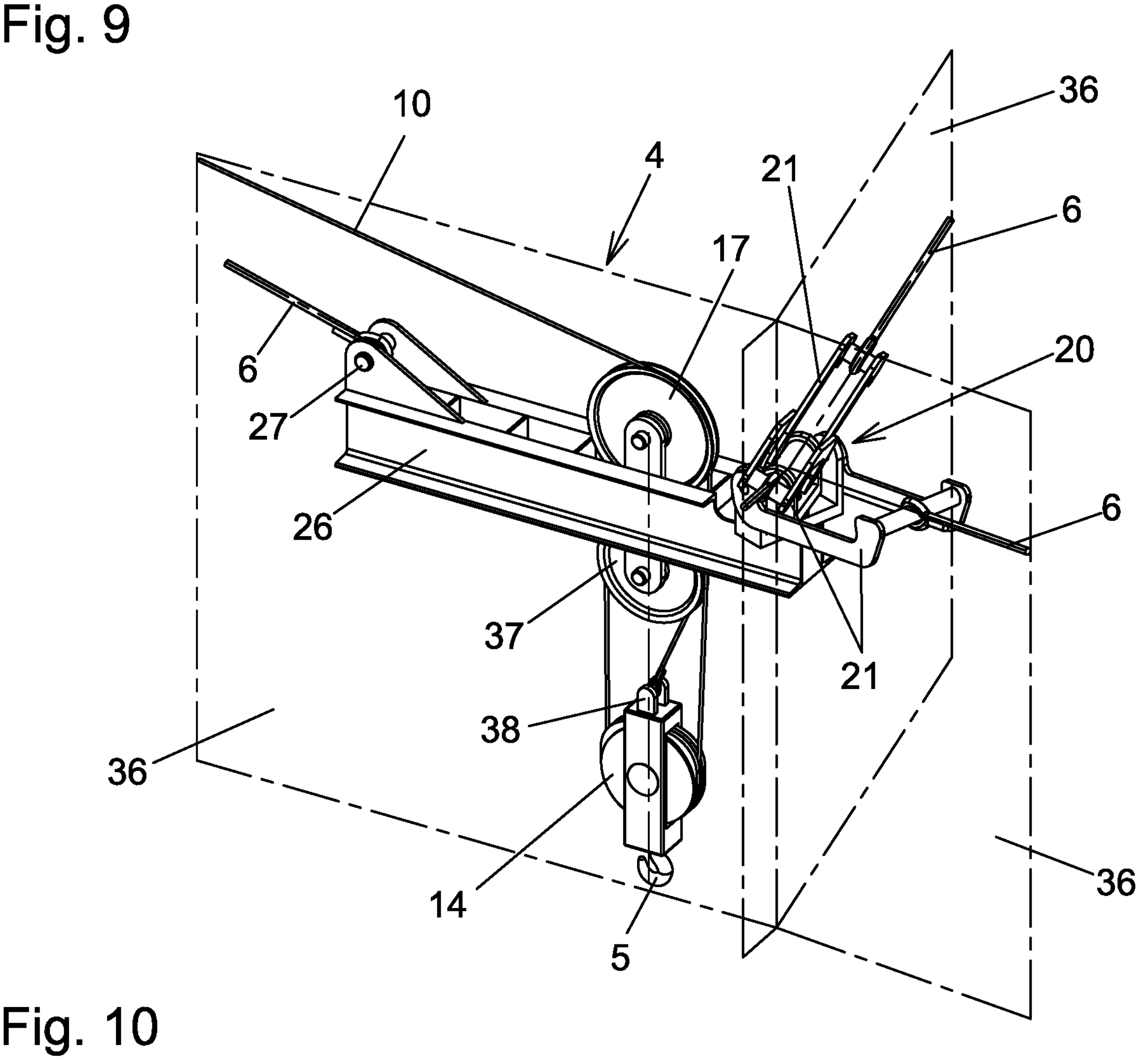
FIGS. 9 to 12 show illustrations pertaining to a first design embodiment of a load carrier and of a load receiving device for a load transport system according to FIGS. 3 to 8.

FIG. 9 now shows a first exemplary embodiment of a load carrier 4 and of a load receiving device 5, as can be used in the exemplary embodiment according to FIGS. 3 to 8. The load carrier 4 has an elongate support beam 26. In this exemplary embodiment, three of the positioning cables 6 are fastened to this support beam 26 by way of a multi-cable suspension 20. The multi-cable suspension 20, as is also illustrated here, preferably engages on one end of the support beam 26. The fourth one of the positioning cables 6 by means of a single-cable suspension 27 is fastened to the opposite end of the support beam 26. The single-cable suspension 27 is disposed on the support beam 26 so as to be spaced apart from the multi-cable suspension 20. Said single-cable suspension 27 is preferably situated at that end of the support beam 26 that is opposite the multi-cable suspension 20, as is shown in this exemplary embodiment. The positioning cable 6 in the single-cable suspension 27 is suspended so as to be pivotable about an axis. Moreover, all positioning cables 6 permit a certain rotation about the longitudinal axis thereof. The multi-cable suspension 20, as is implemented here, will be explained in more detail further below by means of FIGS. 11 and 12. It is however to be pointed out that in the case of the multi-cable suspension 20 also in this exemplary embodiment, each of the positioning cables 6 engaging thereon is in each case connected to the load carrier 4 by way of one cable connected 21, wherein each of these cable connectors 21 by way of at least two pivot axes 22, 23, 24, 25 that are aligned so as to be mutually orthogonal is pivotably mounted on the multi-cable suspension 20, and all pivot axes 22, 23, 24, 25 of the cable connectors 21 intersect in a common intersection point 39 of this multi-cable suspension 20. This preferably applies at all times, thus in all positions or operating states, respectively, of the first carrier 4. It is also to be pointed out that the cable connectors 21, as is also shown here in the exemplary embodiment, are in each case favorably configured so as to be elongate. The cable connectors 21 are in each case particularly preferably rigid members. The cable connectors 21 are particularly preferably formed so as to be L-shaped or C-shaped. The cable connectors 21 by way of a first end are in each case fastened to the respective positioning cable 6. The cable connectors 21 by way of the second end, opposite the first end, are in each case pivotably mounted on the multi-cable suspensions 20. A large pivot angle of the respective cable connector 21 about the respective pivot axis 22, 23, 25 of the multi-cable suspension 20 is in particular possible as a result of the L-shaped or, even better, the C-shaped design.

The vertical planes 36 are also shown in FIG. 9. Each of the vertical planes 36 is defined by one of the positioning cables 6 and the slack thereof, as has already been explained further above. In the multi-cable suspension 20, the vertical planes 36 of the positioning cables 6 that are converged in this multi-cable suspension 20 intersect in a vertical intersection line. The common intersection point 39 of the pivot axis 22, 23, 24 and 25 lies on this vertical intersection line, said intersection point 39 being explained in more detail further below.

The load receiving device 5 in this exemplary embodiment is suspended from the load carrier 4 by means of the lifting cable 10 such that said load receiving device 5 is able to be lifted and lowered relative to the load carrier 4. The load receiving device 5 in the exemplary embodiment shown has a simple hook. Said load receiving device 5 can however also be embodied in any other arbitrary form, for example as a gripper, as a magnetic receiving device, as a shovel or in any other manner. In any case, the lifting cable 10, as has already been explained by means of FIGS. 3 to 8, is able to be wound onto a lifting cable winch 9 and unwound from the latter such that the lifting and lowering of the load receiving device 5 relative to the load carrier 4 takes place by winding and unwinding the lifting cable 10. In principle, it is possible that the lifting cable 10 between the load receiving device 5 and the load carrier 4 is guided as a single cable. In the exemplary embodiment shown, the load receiving device 5 has the return pulley 14 for deflecting the lifting cable 10. Since the lifting cable winch 9 in this exemplary embodiment is disposed on one of the suspension devices 7, the lifting cable 10 in this exemplary embodiment is guided to the load receiving device 5 by way of a deflection roller 17 of the load carrier 14. Conjointly with the further deflection roller 37 and the lifting cable fixing 38, a tackle is thus formed. This thus represents an example in terms of the load receiving device 5 favorably being suspended from the load carrier 4 by means of a tackle configured by the lifting cable 10. This is particularly favorable when heavy loads 2 have to be lifted.

Figure 10:
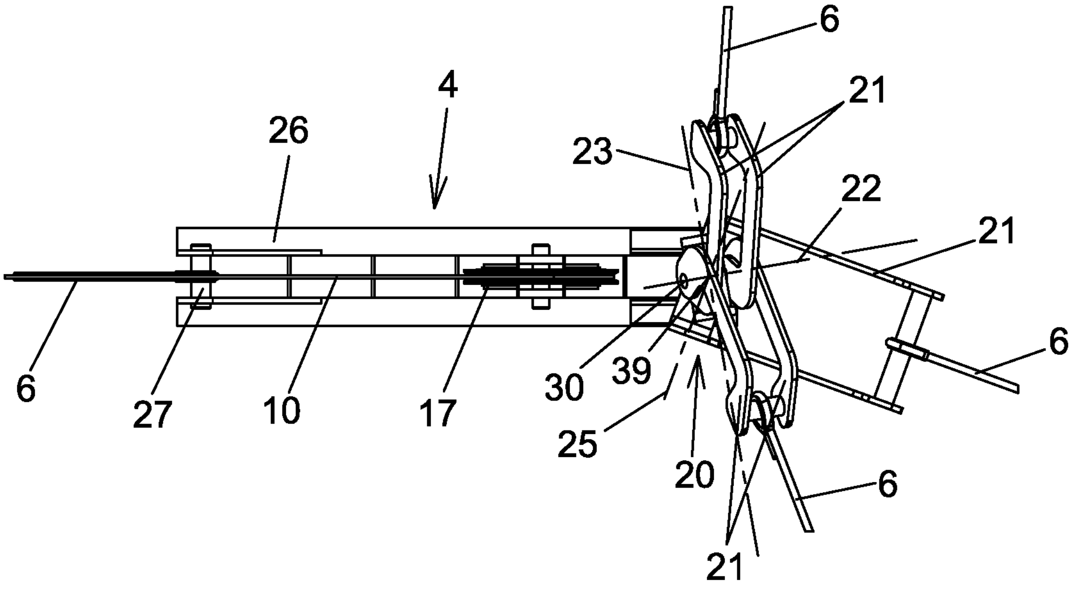
Figure 11:
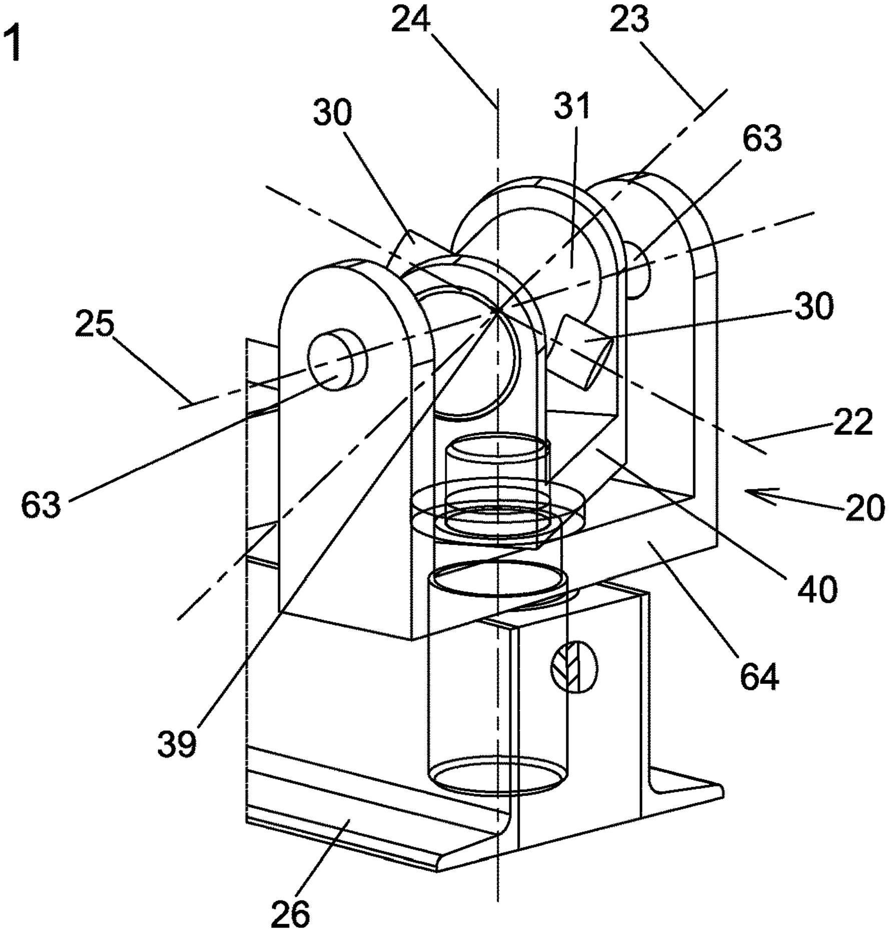
Figure 12:
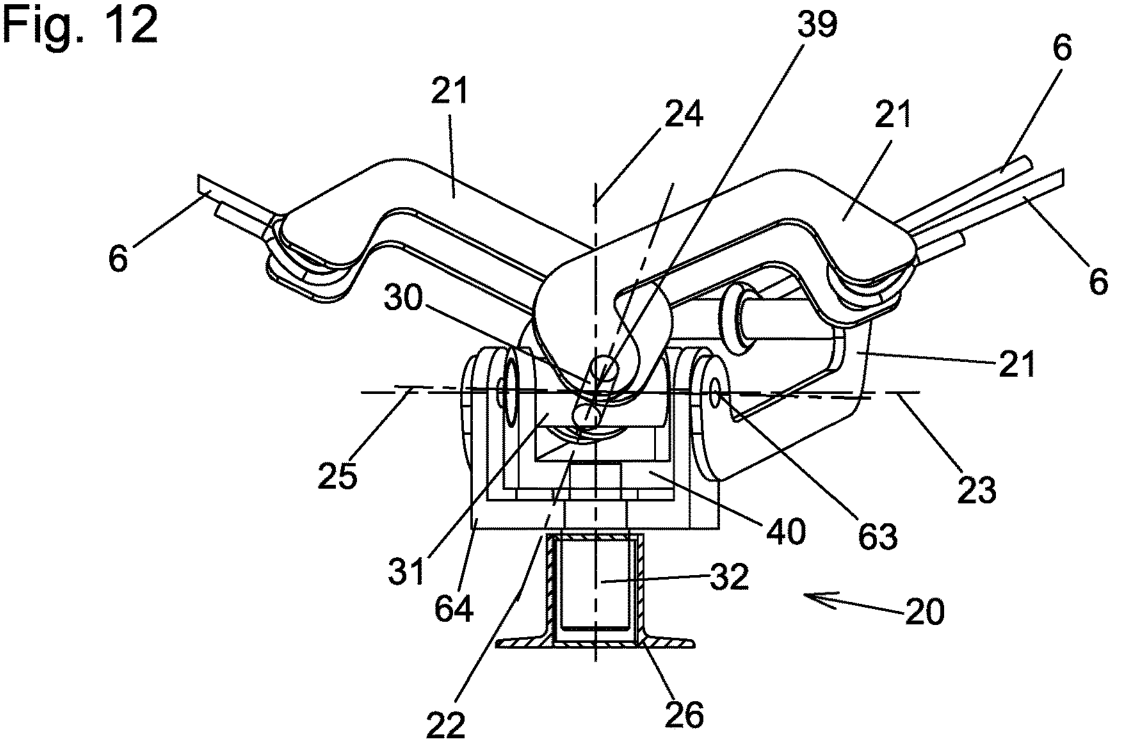

FIG. 10 shows a plan view of the load carrier 4 according to FIG. 9. The pivot axes 22, 23 and 25 which will be explained in yet more detail by means of the diagrams in FIGS. 11 and 12 are also indicated with dashed lines in FIG. 10. In the multi-cable suspension 20 according to FIGS. 9 to 12 it is provided that at least two of the cable connectors 21 by means of at least two mutually orthogonal axle pins 30 and 31 are mounted on the multi-cable suspension 20 so as to be pivotable about the at least two pivot axes 22 and 23 aligned so as to be mutually orthogonal. These two cable connectors 21 in the exemplary embodiment according to FIGS. 11 and 12 shown here are in each case mounted on a first one of the axle pins 30 so as to be pivotable about the first one of the pivot axes 22. The first one of the axle pins 30 by way of the second axle pin 31 is mounted so as to be pivotable about the second pivot axis 23. It is preferably provided, as is illustrated here in FIGS. 11 and 12, that two of the cable connectors 21 are pivotably disposed on a common axle pin 30.

The third cable connector 21 of this exemplary embodiment is mounted on third axle pins 63 so as to be pivotable about the fourth pivot axis 25. The third axle pins 63 in this exemplary embodiment are configured on a yoke 64. This yoke 64 by means of the axle pin 32 is mounted on the support beam 26 so as to be pivotable about the pivot axis 24.

The two axle pins 30 and 31, and thus also the cable connectors 21 engaging thereon, are mounted on the yoke 40 so as to be pivotable about the pivot axis 23. Additionally, the axle pins 30 and 31 in this design embodiment as well as other preferred design embodiments by means of the yoke 40 are conjointly pivotable about the third pivot axis 24. To this end, the yoke 40 in this exemplary embodiment, likewise by means of the axle pin 32, is mounted on the support beam 26 so as to be pivotable about the pivot axis 24. It is however to be pointed out here that the two yokes 40 and 64 are pivotable about the pivot axis 24 in a mutually independent manner. This independent pivoting capability of the yokes 40 and 64 can be achieved by way of a correspondingly independent mounting on the axle pin 32. However, it would of course also be possible for two axle pins to be provided, said axle pins being rotatable in a mutually independent manner about the pivot axis 24 and disposed in a mutually coaxial manner, wherein one of the yokes 40 and 64 would in each case be connected to one of the axle pins. In any case, all four pivot axes 22, 23, 24 and 25 intersect in the common intersection point 39.

It can also be seen in FIG. 12 how the two cable connectors 21 that on the axle pin 30 are conjointly pivotable about the pivot axis 22 are configured so as to be C-shaped. Additionally, the third cable connector 21 is also configured so as to be C-shaped.

Figure 13:
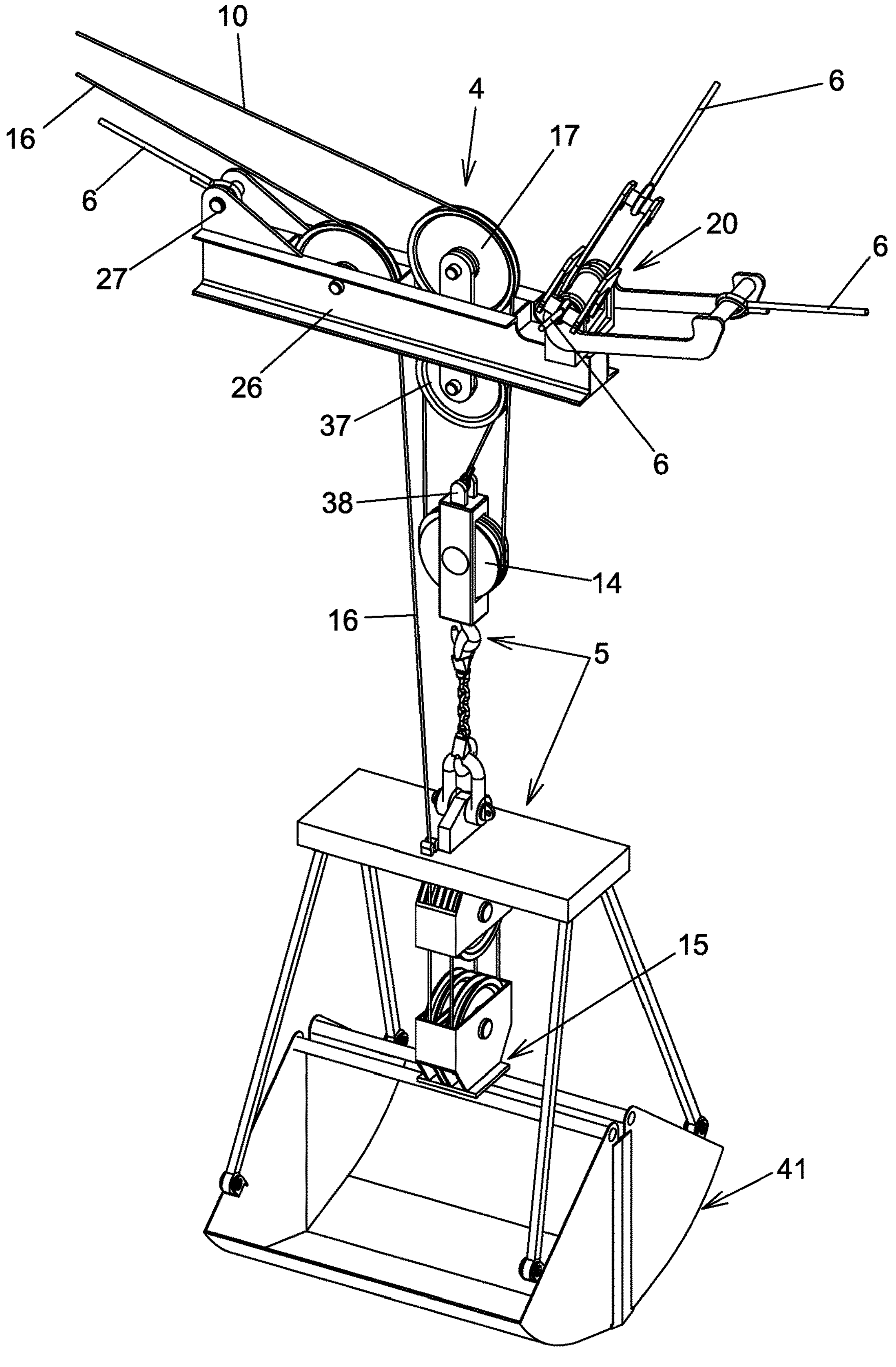
FIG. 13 shows a modified variant of embodiment of the load carrier and the load receiving device based on the design embodiment shown in FIGS. 9 to 12.

FIG. 13 in an exemplary manner now shows a refined variant which is based on the load carrier 4 and the load receiving device 5 according to FIGS. 9 to 12.

The difference in comparison to the exemplary embodiment described above lies in the configuration of the load receiving device 5. The latter in this exemplary embodiment is composed of the hook, already known from FIGS. 9 to 12, and additionally of the grab shovel 41 which is suspended from said load receiving device 5 and can be used for transporting bulk material such as gravel, sand or the like from one place to another. This is an example in which the load receiving device 5 has an activatable actuator 15, wherein an activating cable 16 of the load transport system 1 for activating the actuator 15 is guided to the load receiving device 5 by way of the load carrier 4. The actuator 15 in this exemplary embodiment serves for opening and closing the grab shovel 41, as is known per se. The activating cable 16 on the support beam 26 is deflected by way of a further return pulley 59 and guided from there to an activating cable winch which is not illustrated in more detail here and, like the lifting cable winch 9 and the positioning cable winches 8, can be disposed on one of the suspension devices 7. The activating cable 16, like the lifting cable 10 of this exemplary embodiment, between the load carrier 4 and the suspension device 7, on which the activating cable winch is situated, favorably runs in the vertical plane 36, the latter being defined by the positioning cable 6 suspended from the single-cable suspension 27. Of course, FIG. 13 is only one of many examples how actively activatable grippers or the like can be disposed on the load receiving device 5 by means of an activating cable 16 and an actuator 15. Of course, actuators 15 of a different configuration can also be activated by one or a plurality of corresponding activating cables 16 and be provided in a corresponding manner on the load receiving device 5.

Figure 14:
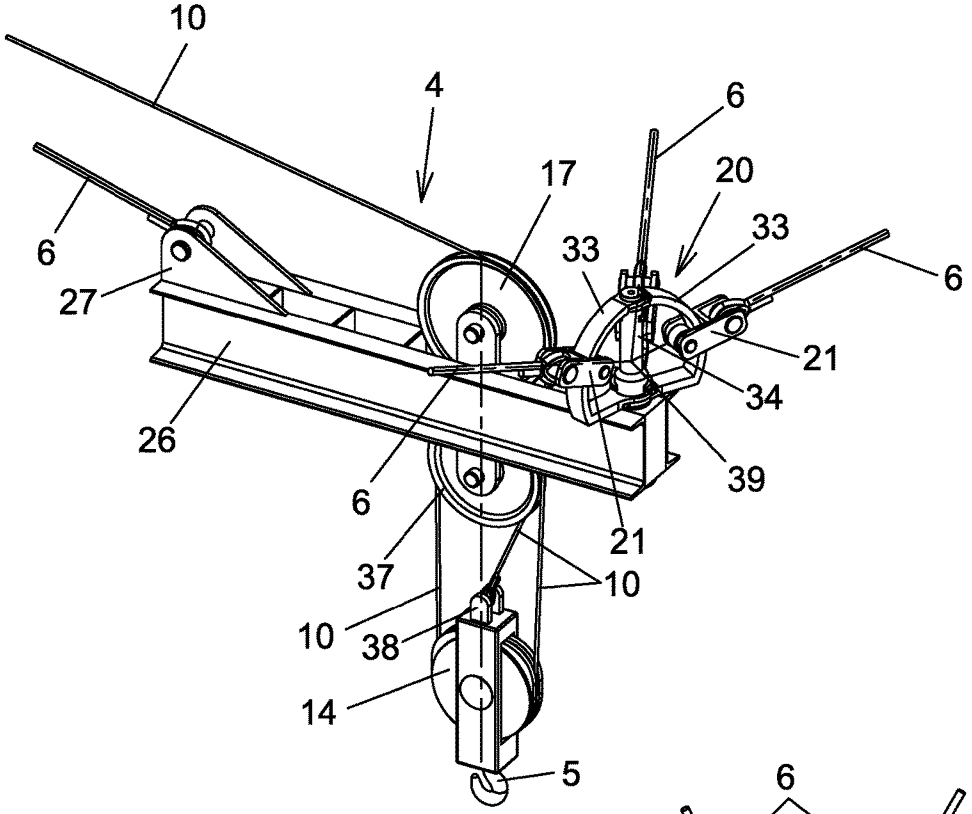
FIGS. 14 to 16 show a third variant of embodiment of a load carrier having a load receiving device for the load transport system according to FIGS. 3 to 8.
Figure 15:
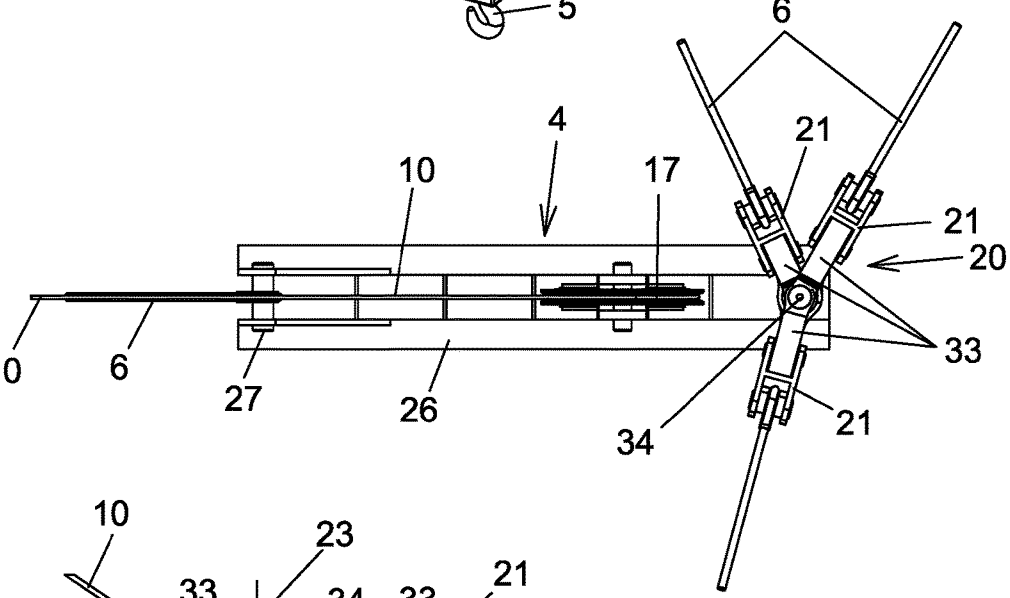
Figure 16:
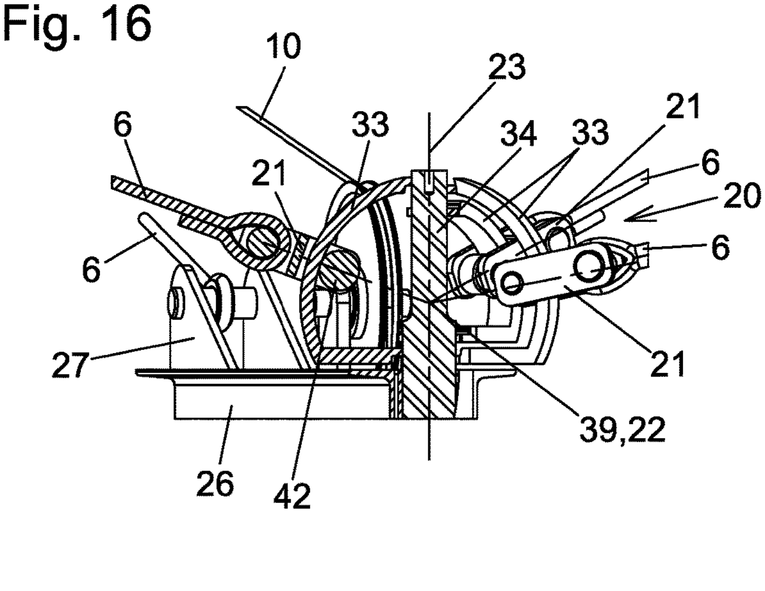

FIGS. 14 to 16 show a further potential design embodiment of the load carrier 4 which can be used in the load transport system 1 according to FIGS. 3 to 8. The differences in comparison to the exemplary embodiment according to FIGS. 9 to 12 lie in the manner of the design embodiment of the multi-cable suspension 20 in which three of the positioning cables 6 converge. The load carrier 4 of FIGS. 14 to 16 otherwise is configured like the load carrier 4 of FIGS. 9 to 12 so that these features do not have to be discussed in more detail. FIG. 14 shows a perspective view of this load carrier 4, while FIG. 15 shows a plan view. The manner of the configuration of the multi-cable suspension 20 can be particularly readily seen in FIG. 16. FIG. 16 is a partially sectional illustration. In any case, this is an exemplary embodiment in which the multi-cable suspension 20 for each of the cable connectors 21 pivotably mounted thereon has an arcuate guide 33 on which the respective cable connector 21 is guided for pivoting about a first one of the orthogonal pivot axes 22, and the arcuate guide 33 of the respective cable connector 21 for pivoting the respective cable connector 21 about a second one of pivot axes 22 aligned so as to be mutually orthogonal are pivotable about a common axle pin 34. One of the cable connectors 21 and the arcuate guide 33 thereof as well as the axle pin 34 are illustrated in a sectional or hatched manner, respectively, in FIG. 16. The cable connectors 21 and arcuate guides 33 not illustrated in a sectional or hatched manner, respectively, are configured in an analogous manner. It can be readily seen in FIG. 16 that the sectionally illustrated cable connector 21 by means of a roller 42 can roll on the arcuate guide 33. Of course, a sliding face or the like may also be used instead of the roller 42. In any case, as a result of this cable connector 21 being correspondingly guided on the arcuate guide 33, this cable connector 21 is pivotable about the pivot axis 22 that in FIG. 16 is normal to the sheet plane and runs through the common intersection point 39. The pivot axis 23 which is orthogonal thereto and likewise runs through the common intersection point 39 is in this exemplary embodiment the longitudinal axis of the axle pin 34. The cable connectors 21 conjointly with the respective arcuate guides 33 thereof can be pivoted about the common axle pin 34 and thus about the pivot axis 23. As a result of this manner of the multi-cable suspension 20 it is also achieved that each cable connector 21 is mounted on the multi-cable suspension 20 so as to be pivotable about at least two pivot axes 22 and 23 aligned so as to be mutually orthogonal, and all pivot axes 22 and 23 of the cable connectors intersect in the common intersection point 39 of this multi-cable suspension 20. In this manner of the design embodiment of the multi-cable suspension 20 it is preferably provided that the cable connectors 21 are configured so as to be straight, as is also shown here.

Figure 17:
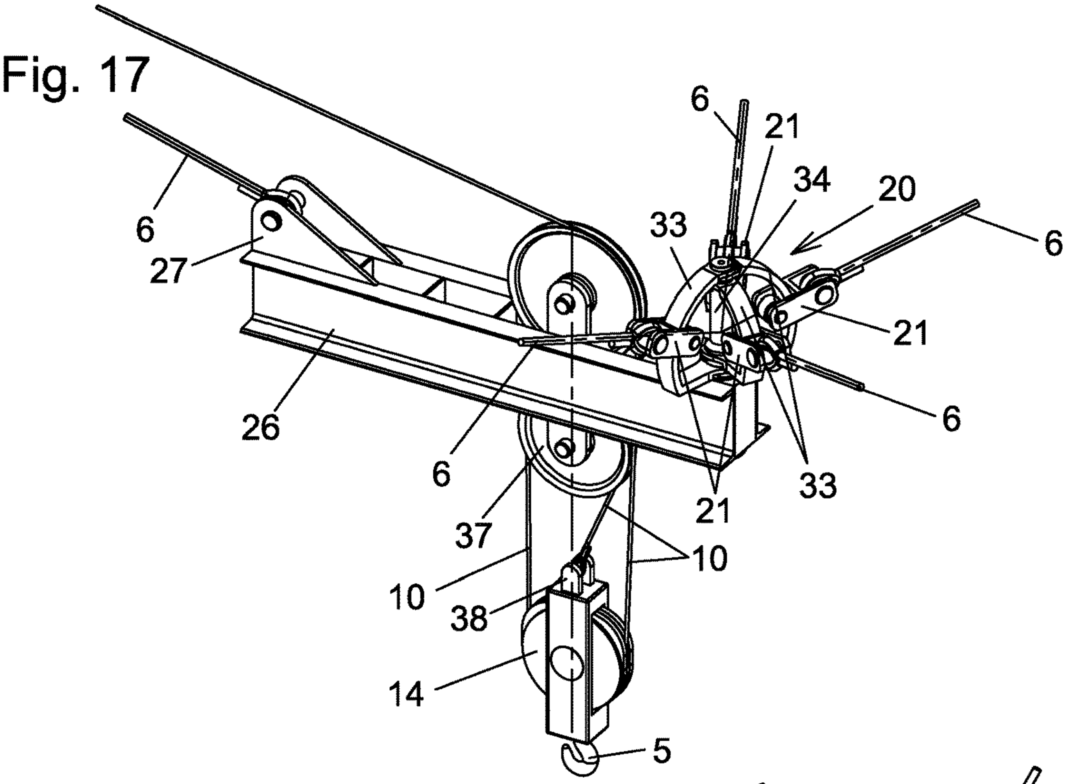
FIGS. 17 to 19 show a design embodiment of a load carrier and of a load receiving device for a load transport system having five positioning cables.
Figure 18:
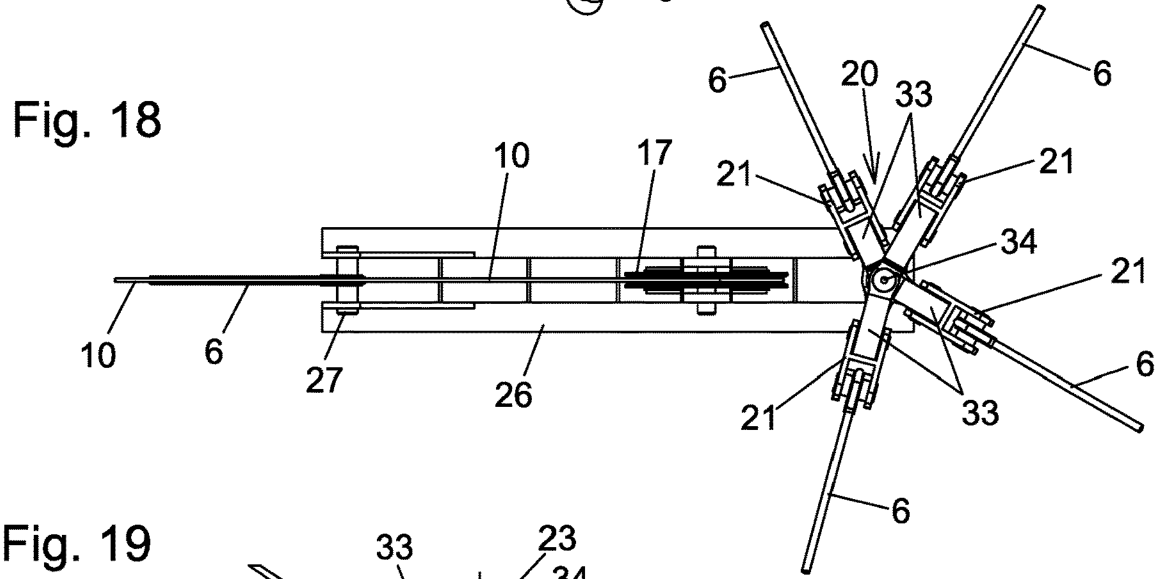
Figure 19:
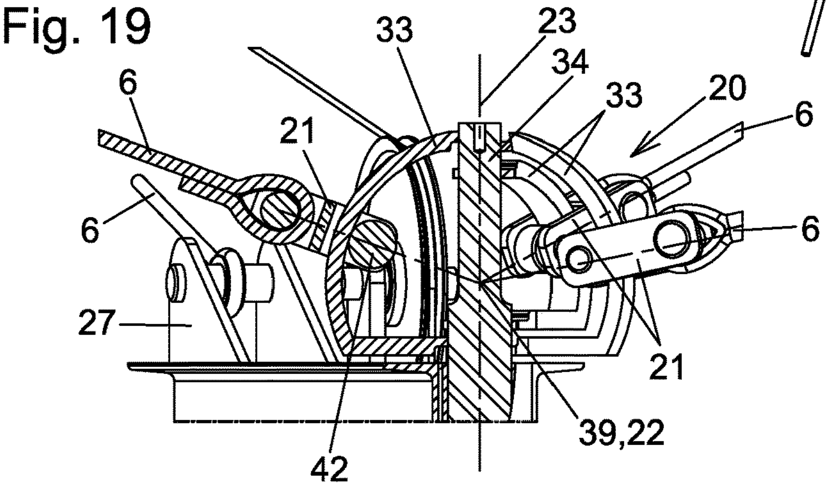

This manner of the multi-cable suspension 20 having the arcuate guides 33 for the respective cable connectors 21 is particularly favorable when comparatively many positioning cables 6 are to converge in one multi-cable suspension 20. Accordingly, FIGS. 17 to 19 show an example in which four positioning cables 6 converge in such a multi-cable suspension 20. The technology of this multi-cable suspension 20 and of this exemplary embodiment of a load carrier 4 having the load receiving device 5 according to FIGS. 17 to 19 otherwise corresponds to the variant according to FIGS. 14 to 16 so that reference is made to the above for the avoidance of repetitions.

Figure 20:
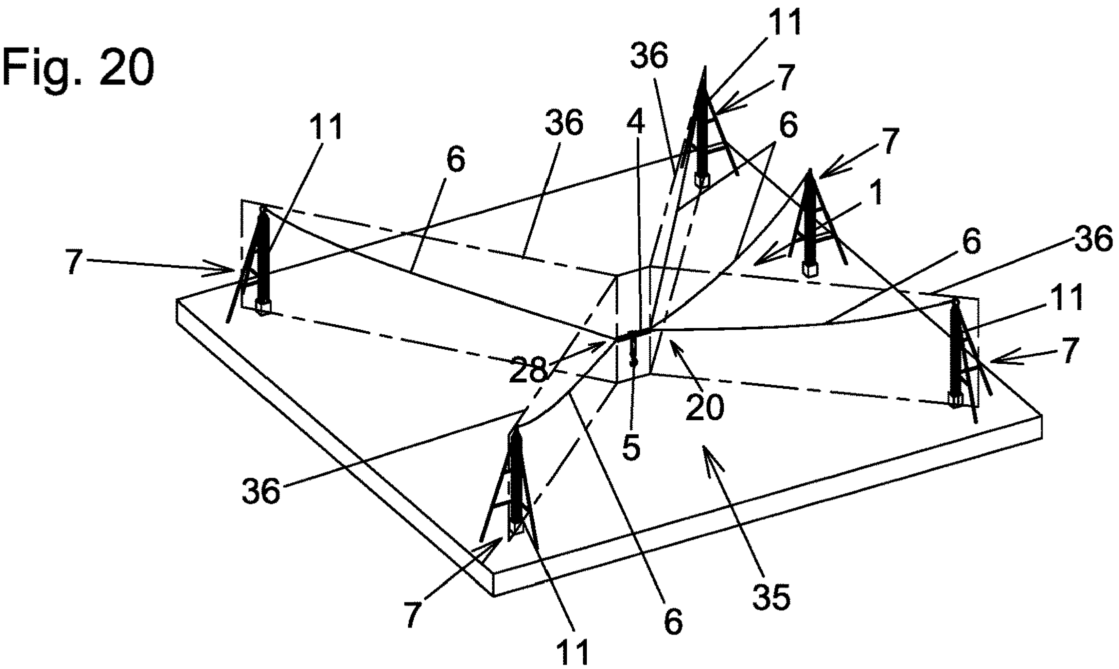
FIGS. 20 and 21 show illustrations pertaining to a further load transport system according to the invention.
Figure 21:
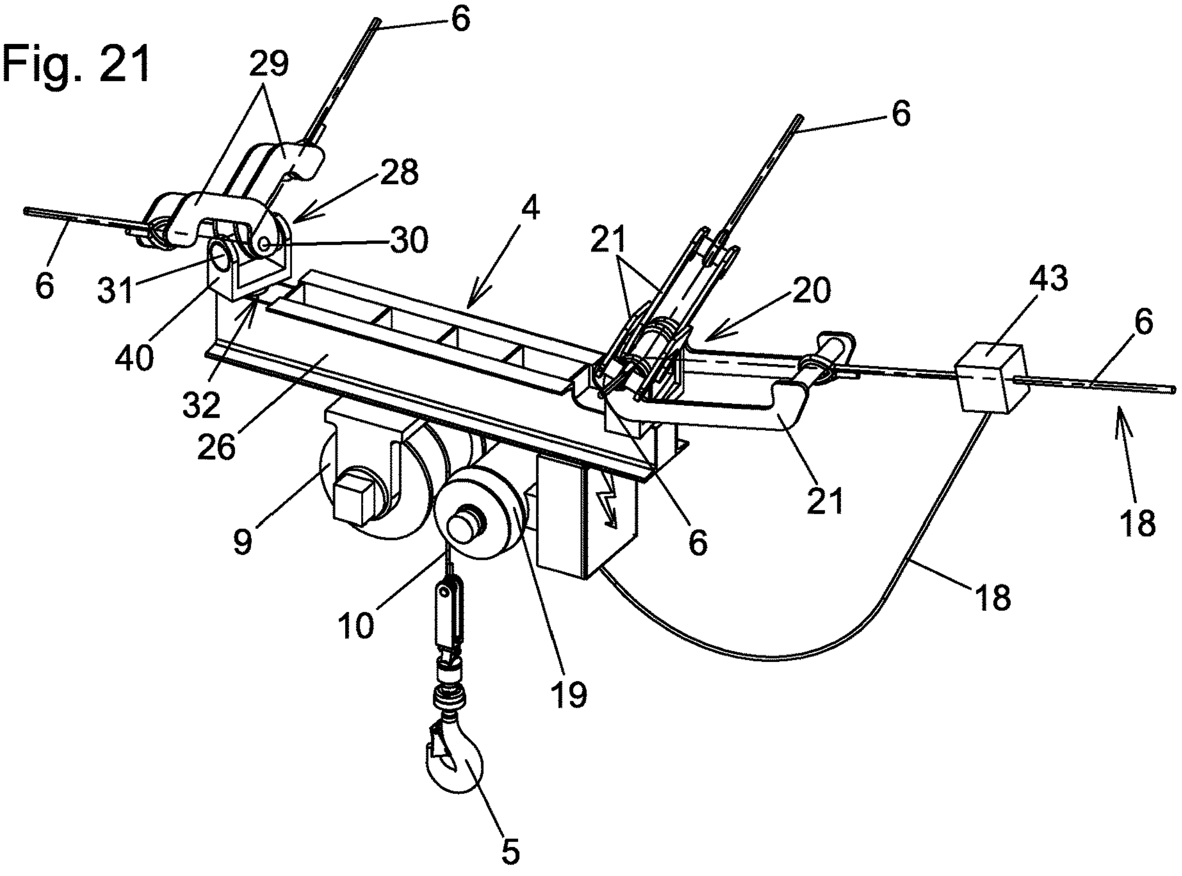

A further exemplary embodiment of the invention is shown in FIGS. 20 and 21. FIG. 20 shows a schematic illustration of the entire load transport system 1, while FIG. 21 shows a detailed illustration of the type of the load carrier 4 used therein. A first difference in comparison to the variants of embodiment shown to date lies in that it is shown in an exemplary manner in this exemplary embodiment that the positioning cables 6 can also be fastened to the load carrier 4 by way of more than one multi-cable suspension 28. In the exemplary embodiment according to FIGS. 20 and 21, the load carrier 4 has a further multi-cable suspension 28 by means of which at least two other ones of the positioning cables 6 are connected to the load carrier 4. The multi-cable suspension 20 and the further multi-cable suspension 28 are mutually spaced apart, preferably disposed on mutually opposite ends of the support beam 26. The multi-cable suspension 20 in which three positioning cables 6 converge is configured as in the exemplary embodiment according to FIGS. 9 to 12. The further multi-cable suspension 28, disposed on the other end of the support beam 26, converges two positioning cables 6 on the load carrier 4. The technology of this further multi-cable suspension 28 otherwise is however the same as in the multi-cable suspension 20 for the three positioning cables 6. Here too, the construction having the first axle pin 30, having the second axle pin 31 and the yoke 40 as well as the third axle pin 32 disposed therein is implemented in order for the pivot axes 22, 23 and 24 to be implemented. The further cable connectors 29 in terms of the construction thereof also correspond to the cable connectors 21. It is thus also provided here that each of the further cable connectors 29 is mounted on the further multi-cable suspension 28 so as to be pivotable about at least two pivot axes aligned so as to be mutually orthogonal, and all pivot axes of the further cable connectors 29 intersect in a common intersection point of this further multi-cable suspension 28.

A further difference in comparison to the preceding exemplary embodiments lies in that the lifting cable winch 9 in this exemplary embodiment according to FIGS. 20 and 21 is not disposed on one of the suspension devices 7 but directly on the load carrier 4. Moreover, a drive motor 19 which for rotating the lifting cable winch 9 by way of the power supply line 18 is fed with electric power is disposed on the load carrier 4, or on the support beam 26, respectively. The power supply line 18 for supplying the drive motor 19 of the lifting cable winch 9 with electric power in this exemplary embodiment is in part integrated in one of the positioning cables 6 and in part guided to the lifting cable winch 9 as a separate line 18. In the exemplary embodiment shown here, the power supply line 18, in a manner know per se, is specifically intertwined in one of the positioning cables 6 and thus guided to one of the suspension devices 7 and thereon to a current feed, known per se, in the positioning cable winch 8. The power supply line 18 is uncoupled from the positioning cable 6 at the uncoupling mechanism 43 and then guided as a separate line to the drive motor 19.

Of course, other variants of embodiment are also conceivable. For example, the power supply line 18 could also be guided completely as a separate line to one of the suspension devices 7. In this instance, it would in any case be favorable if said power supply line 18 were however guided in a vertical plane 36 of one of the positioning cables 6. It is however likewise conceivable that the power supply line 18 integrated in the positioning cable 6 is guided directly into the load carrier 4 by way of a corresponding cable connector 21 and the corresponding multi-cable suspension 20 or 28, respectively, or a corresponding single-cable suspension 27.

Figure 22:
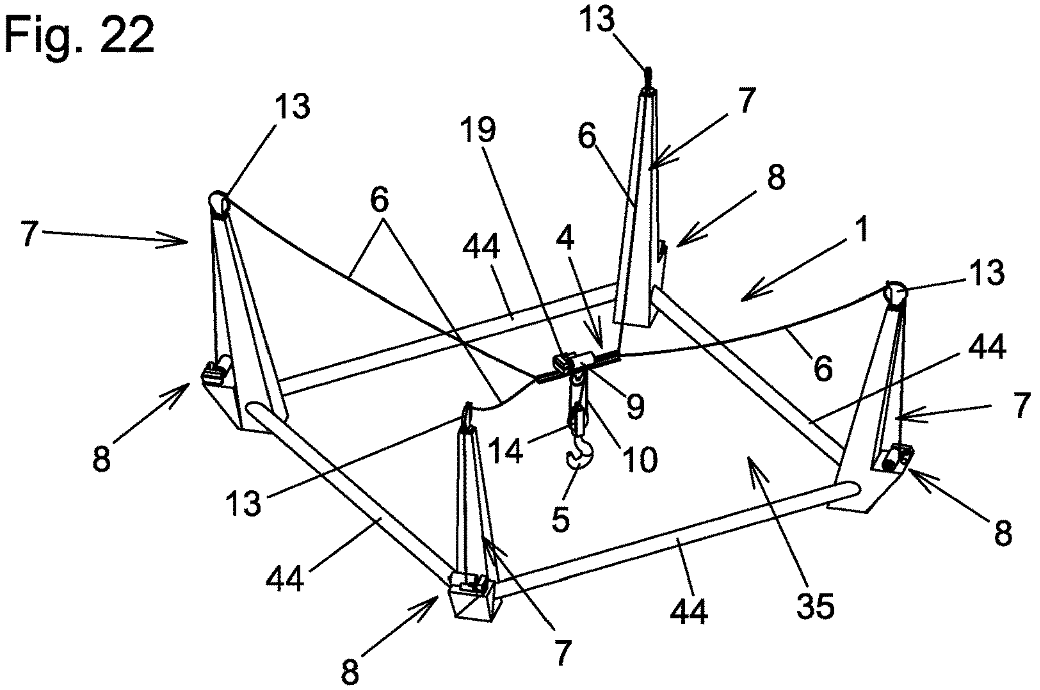
FIG. 22 shows a variant pertaining to how suspension devices can be connected to one another.

FIG. 22 now shows in an exemplary manner that the suspension devices 7 of the load transport systems 1 according to the invention can not only be embodied as initially separate formations, as in the exemplary embodiments explained to date. In the exemplary embodiment according to FIG. 22, the suspension devices 7 are fixedly connected to one another by means of corresponding struts 44 such that the load transport system 1 in this configuration can be set up on the respective surface 35 of the terrain and from there can also be transported to another location. Such design embodiments of the load transport systems 1, in which the suspension devices 7 are fixedly connected to one another by means of struts 44, can be particularly readily implemented when the load transport system 1 is not excessively large. The construction having the struts 44 in any case has the advantage that the load transport system 1 can be set up on the respective surface 35 of the terrain in a comparatively unproblematic and rapid manner, as a result of which anchoring of the suspension device 7 can optionally be embodied in a relatively simple manner or entirely omitted.

In this exemplary embodiment according to FIG. 22, the lifting cable winch 9 is also disposed directly on the load carrier 4 so that the infeed of the lifting cable 10 from one of the suspension devices 7 to the load carrier 4 can be dispensed with. The infeed of the power supply line 18 for the drive motor 19 of the lifting cable winch 9 can take place as explained by means of FIG. 21 or in any other suitable manner. Of course, as opposed to as illustrated in FIG. 22, the lifting cable 10 could also be guided to one of the suspension devices 7.

Figure 23:
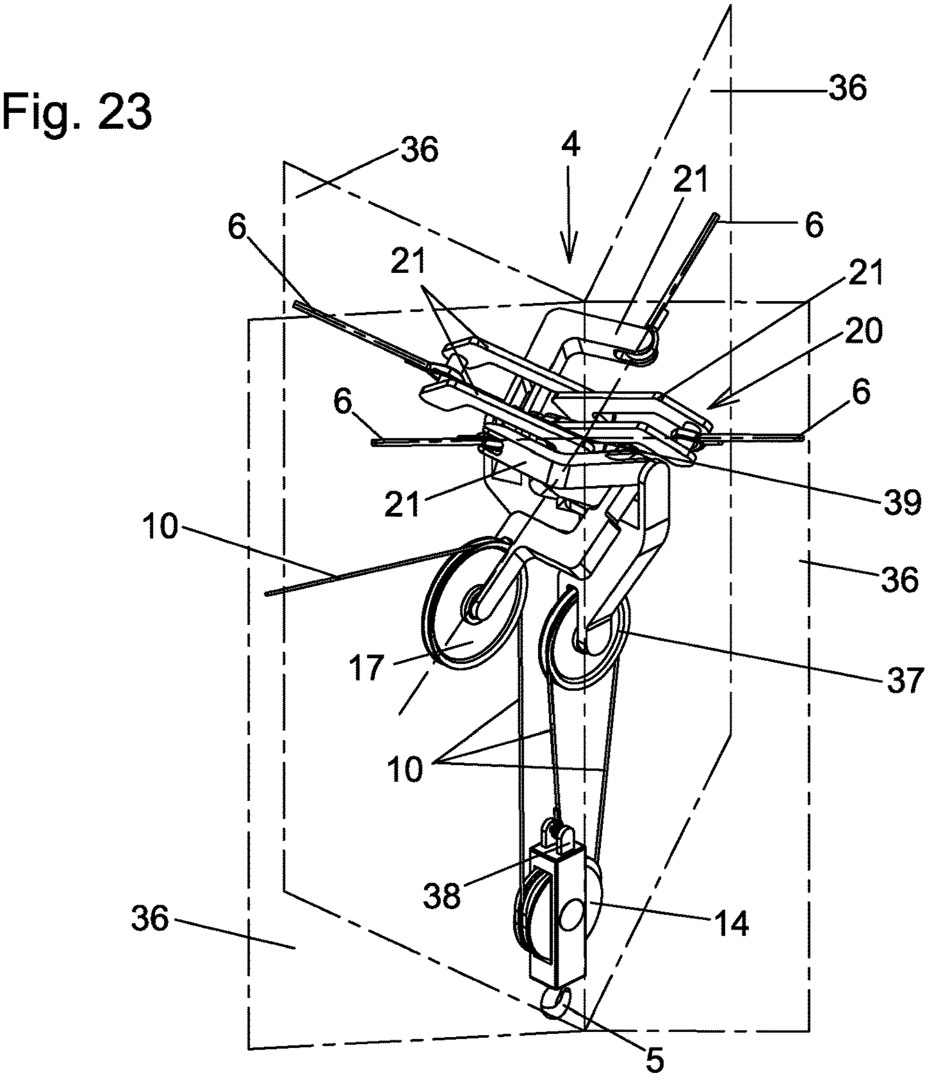
FIGS. 23 and 24 show in each case one design embodiment of a load carrier for a load transport system according to the invention having a single multi-cable suspension for all positioning cables.
Figure 24:
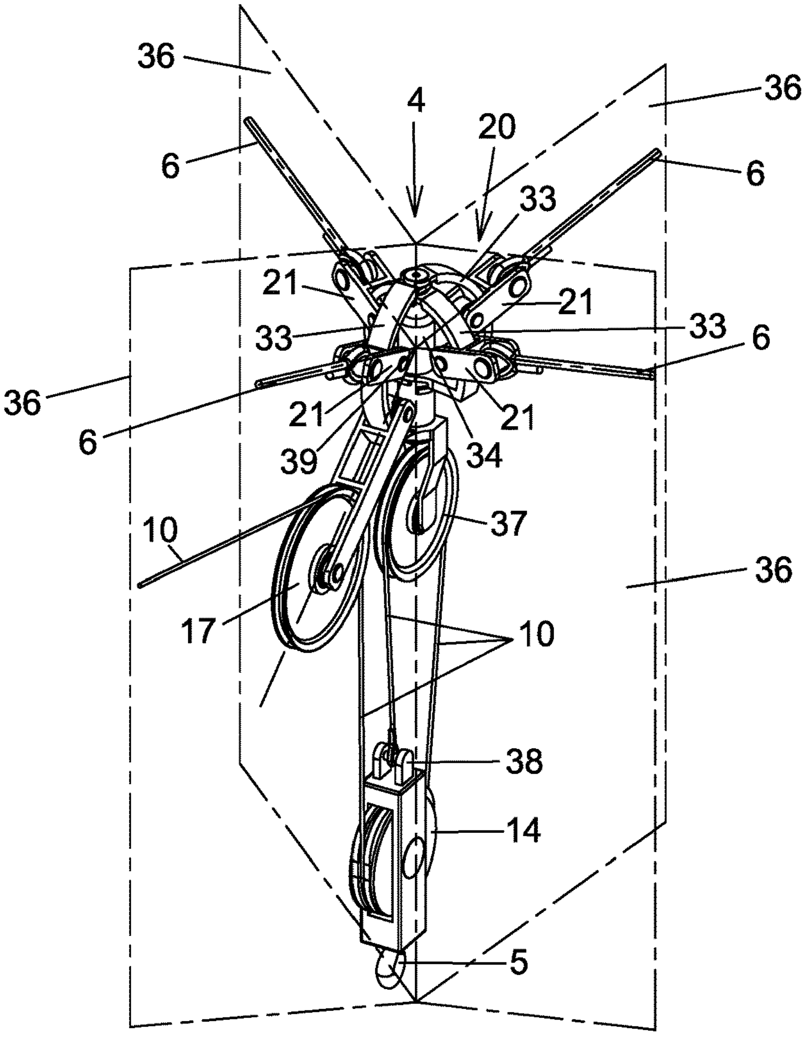

FIGS. 23 and 24 now show load carriers 4 for load transport systems 1 according to the invention, in which all positioning cables 6 of the load transport system 1 by means of a single multi-cable suspension 20 are in each case connected to the load carrier 4 by way of one cable connector 21. In these exemplary embodiments it is also provided that each cable connector 21 is mounted on the multi-cable suspension 20 so as to be pivotable about at least two pivot axes 22, 23, 24 that are aligned so as to be mutually orthogonal, and all pivot axes 22, 23, 24 of the cable connectors 21 intersect in a common intersection point 25 of this multi-cable suspension 20. In FIG. 23 here, the same technology is used in a correspondingly adapted manner as has been explained in more detail by means of FIGS. 11 and 12. FIG. 24 shows a refinement of the technology having arcuate guides 33 for the cable connectors 21, said technology being embodied in a manner analogous to the examples according to FIGS. 14 to 19.

Figure 25:
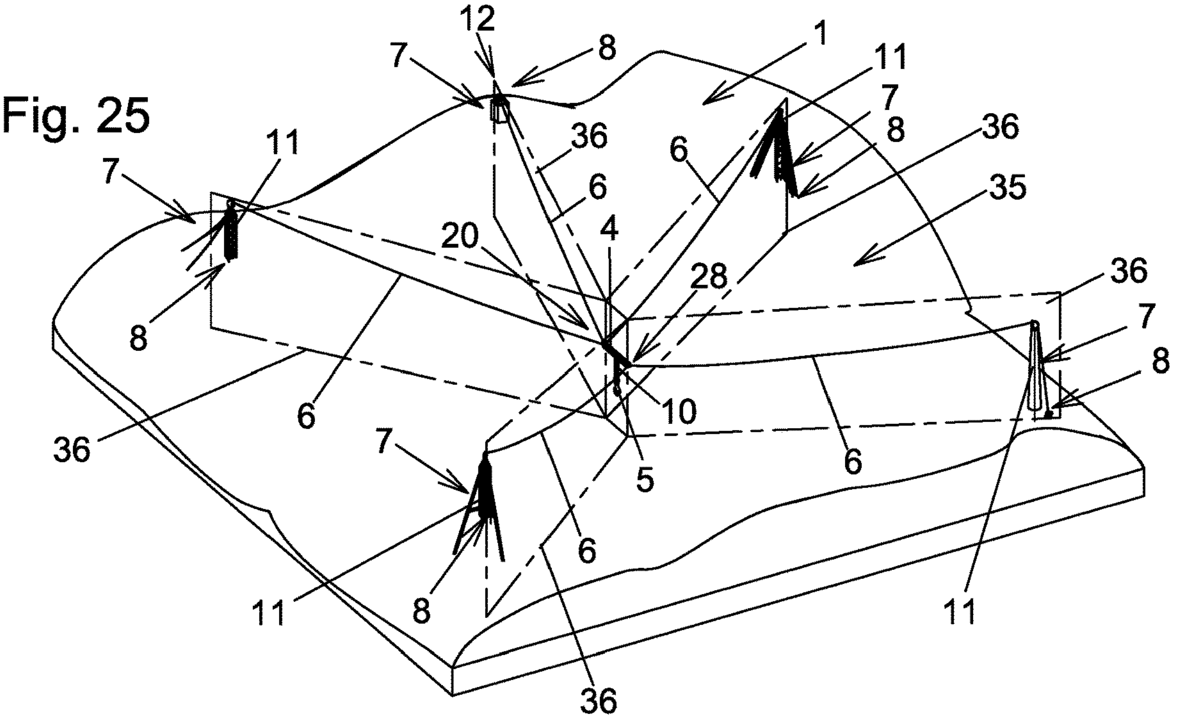
FIGS. 25 and 26 show a further exemplary embodiment according to the invention of a load transport system.

FIG. 25 shows a variant of embodiment of a load transport system 1 which has a total of five positioning cables 6 and is constructed above a surface 35 of a terrain having a comparatively inconsistent topography. Different types of suspension devices 7 are used in this example. Four of the five suspension devices 7 here have masts 11. One of the suspension devices 7 is configured in the form of a tower 12. The suspension device 7 configured as a tower 12, and the positioning cable winch 8 disposed thereon, are illustrated in more detail in FIG. 26. It can be readily seen in FIG. 26 that the positioning cable winch 8 in this variant is situated on the top of the suspension device 7 configured as tower 12. The positioning cable winch 8 is driven by a drive motor 47 which is likewise disposed on this tower 12. The positioning cable winch 8 and the drive motor 47 in this exemplary embodiment are situated on a pivot plate 46. This is thus a first exemplary embodiment in which the positioning cable winch 8 is disposed so as to be pivotable on the respective suspension device 7. The pivoting in the exemplary embodiment according to FIG. 26 takes place about the vertical pivot axis 60. This here is preferably a free pivoting capability in which the tension on the positioning cables 6 exclusively decides the direction in which the positioning cable winch 8 is pivoted. Of course, a motorized drive which is not indicated here can also be provided for pivoting the positioning cable winch 8.

Figure 26:
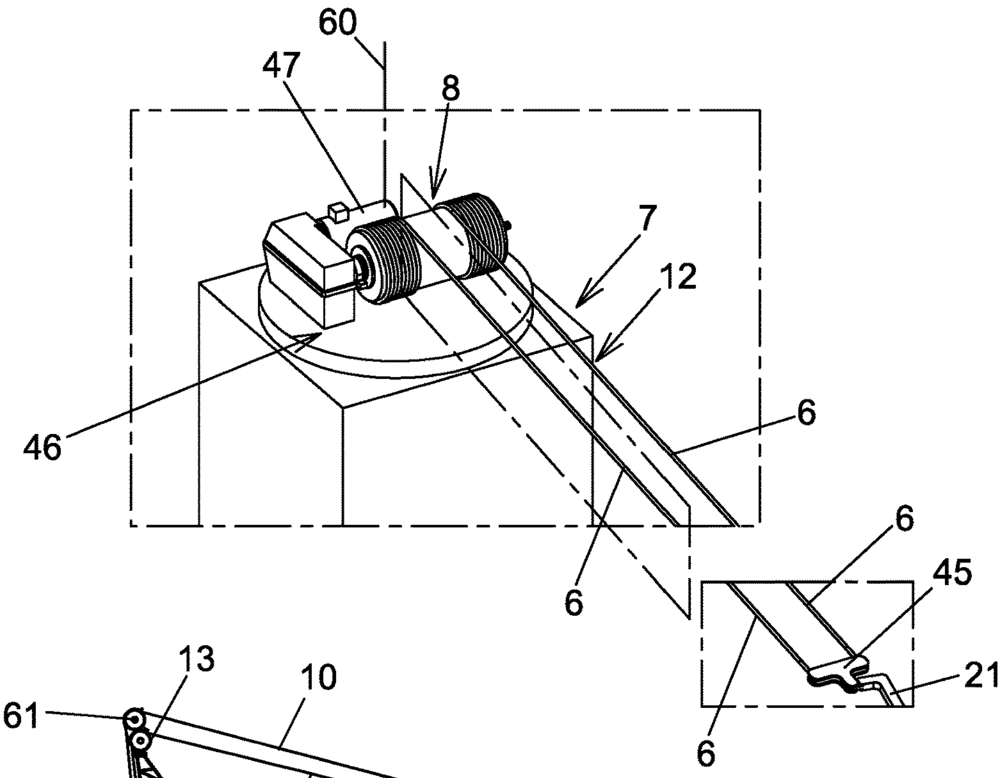

FIG. 26 is also an example in which not only one positioning cable 6 but two positioning cables 6 in parallel are guided from a positioning cable winch 8 to the respective cable connector 21 and thus to the load carrier 4. As is also illustrated in FIG. 26, the two positioning cables 6 at the end thereof that faces away from the positioning cable winch 8 are connected to one another by means of a crossmember 45. The cable connector 21, which can open into a multi-cable suspension 20 or 28 in any manner already described, engages on this crossmember 45. Of course, the two positioning cables 6 of this variant embodiment, by way of the crossmember 45, could also be fed to a single-cable suspension 27 of a corresponding load carrier 4.

In any case, it is to be pointed out that FIG. 26 shows an example in which the positioning cable winch 8 is disposed directly at the top of the suspension device 7, or the tower 12, respectively, such that additional return pulleys 13 for the positioning cable/cables 6 are dispensed with. The different variations shown by means of FIG. 26 can of course also be embodied individually or in combination with other variants.

Figure 27:
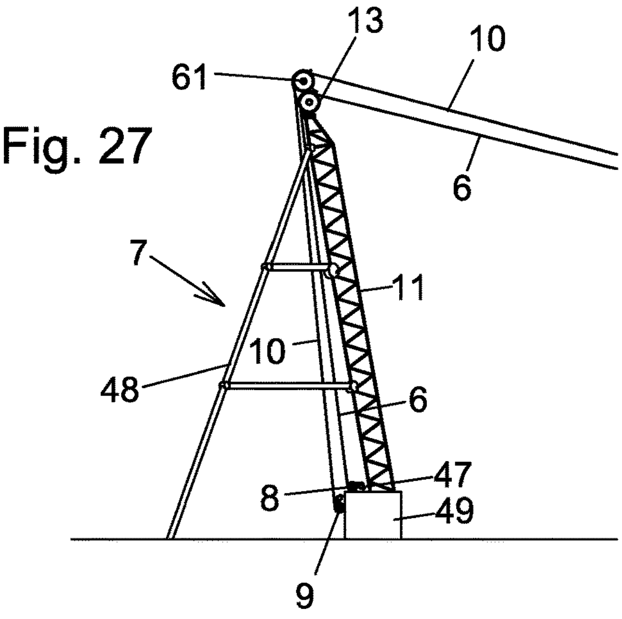
FIGS. 27 to 32 show illustrations pertaining to examples of potential design embodiments of suspension devices and positioning cable winches for load transport systems according to the invention.
Figure 28:
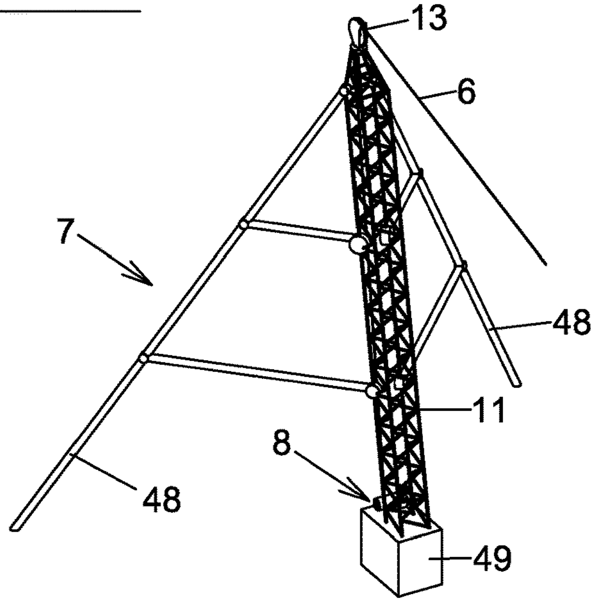

FIGS. 27 and 28 in an exemplary manner now show a suspension device 7 which has at least one mast 11, wherein a return pulley 13 for the positioning cable 6 suspended from this suspension device 7 is disposed on the mast 11. The return pulley 13 is favorably situated at the tip of the mast. Said return pulley 13 could however also be disposed further below the mast 13. In any case, the positioning cable 6, emanating from the load carrier 4, by way of the return pulley 13 is guided to the positioning cable winch 8 fastened further below to the suspension device 7. Additionally illustrated in an exemplary manner in FIG. 27 is also a further return pulley 61 which is fastened to the mast 11 above the return pulley 13. The lifting cable 10, if required, by way of this further return pulley 61 can be guided to the lifting cable winch 9 that is fastened further below to the suspension device 7. This is not illustrated in FIG. 28.

The suspension device 7 in FIGS. 27 and 28 in any case has two tie bars 48 which are anchored in the respective hard ground. In contrast, the mast 11 stands on the hard ground by means of a base 49. This may already be sufficient because only compressive forces are exerted on the surface 35, or on the hard ground, respectively, by way of the mast 11 in this design embodiment. Of course, the base 49 can also be connected to the hard ground in a suitable manner. The base 49 can also be a cast concrete foundation or the like, for example.

Figure 29:
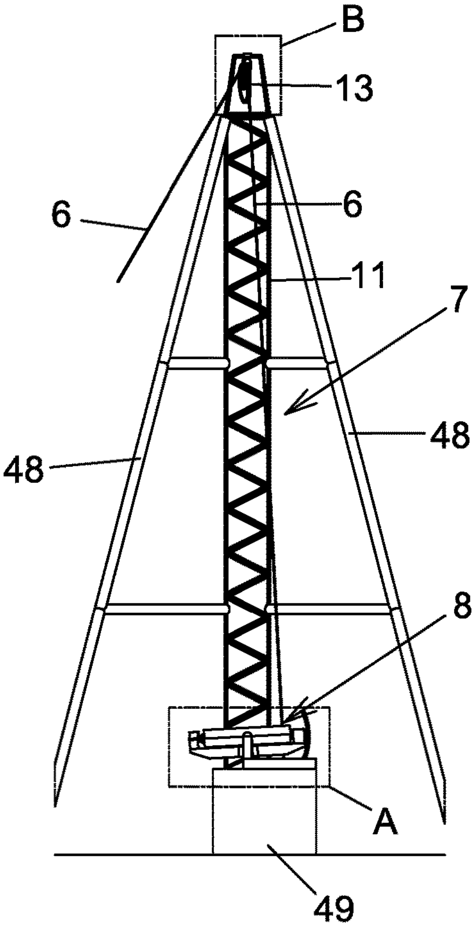
Figure 30:
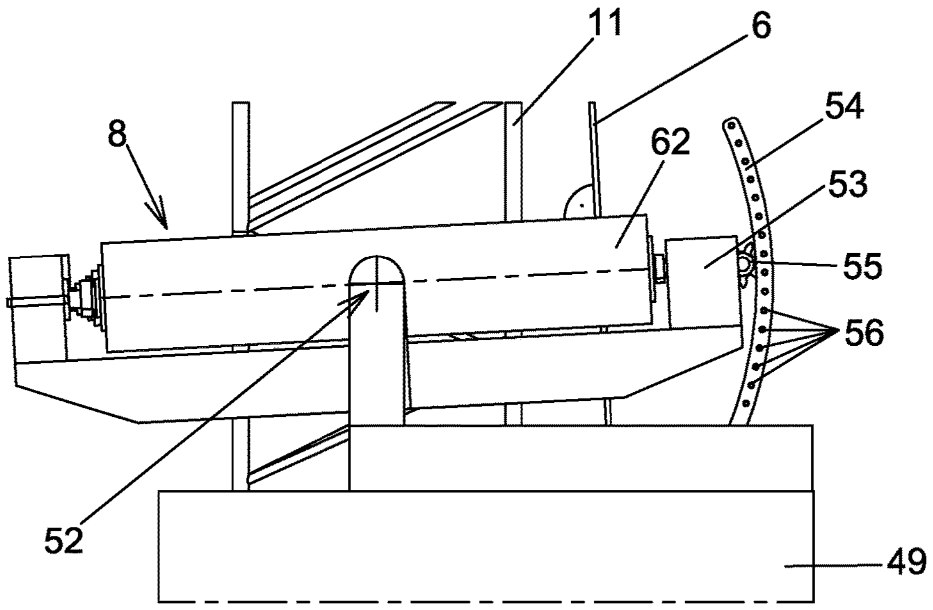

In order for the wear and tear on the cables and on the cable winches to be minimized as far as possible, it is favorable for the respective cable to run orthogonally onto the cable winch. In order for this to be guaranteed, it is generally favorable for the cable winch to be pivotably mounted. This pivotable mounting is particularly advantageous when the respective cable runs directly, without deflection, to the load carrier 4, as is shown by means of the exemplary embodiment in FIG. 26. Another group of variants of embodiment in which the pivotable mounting of the respective cable winch is favorable is one in which the respective return pulley is disposed so as to be comparatively close to the cable winch. In FIGS. 29 and 30 it is shown in an exemplary manner by means of a positioning cable 6 and a corresponding positioning cable winch 8 how this pivotable mounting of the cable winch can be embodied, for example. This can be embodied in an analogous manner for a lifting cable winch 9 as well as for a cable winch of an activating cable 16, without this being explicitly shown here. FIG. 29 shows in an exemplary manner how the positioning cable winch 8 is disposed on the base 49 and thus on the suspension device 7. The positioning cable 6 from the positioning cable winch 8 runs to the load carrier 4, not illustrated here, by way of the return pulley 13 disposed on the tip of the mast 11. The suspension device 7 can be embodied as shown in FIGS. 27 and 28, for example.

FIG. 30 shows the region A from FIG. 29, with the positioning cable winch 8 being somewhat enlarged. It can be readily seen therein that the positioning cable winch 8 is mounted so as to be pivotable about the pivot axis 52. This here is a motorized pivoting capability. To this end, the cable drum 62 of the positioning cable winch 8, which cable drum 62 by means of a motor is rotatable about the longitudinal axis thereof and onto which the positioning cable 6 is wound and from which the positioning cable 6 is unwound, by means of a step-up gearbox 53 is connected to a pinion 55. This pinion 55 engages in the pins 56 of a lantern gear 54 which is configured so as to be curved. Of course, a curved rack could also be used instead of the curved lantern gear 54. The transmission 53 ensures that the pinion 55 in a manner adapted to the winding and unwinding speed ensures in each case an optimal pivot angle such that the positioning cable 6 is at all times more or less orthogonal to the cable drum 62 and thus runs onto the latter and from the latter. Of course, this motorized pivoting capability of the positioning cable winch 8, or of the cable winch in general, could also be implemented in a different manner. For example, a corresponding drive motor could be placed directly on the pivot axis 52. A separately actuated motor could also be used instead of the transmission 53 in order for the pinion 55 to be driven. Of course, there are numerous further possibilities therebeyond.

Figure 31:
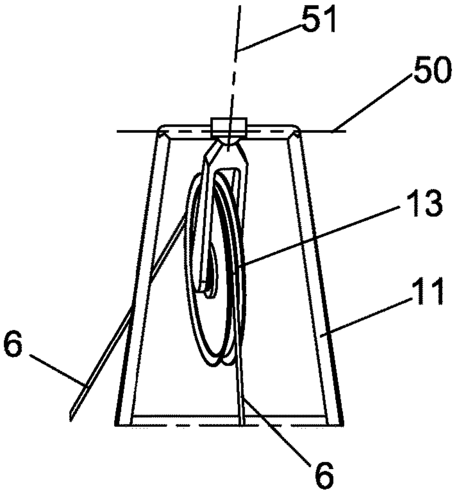

FIG. 31 in an exemplary manner now shows the tip of the mast in the region B from FIG. 29. It is illustrated here how the return pulley 13 is mounted on the suspension device 7 so as to be pivotable about the two orthogonal pivot axes 50 and 51. This also serves for guiding the respective cable, presently the positioning cable 6, with as little wear and tear as possible from the respective cable winch, thus presently the positioning cable winch 8, to the load carrier 4. Corresponding constructions are of course also favorable in terms of corresponding return pulleys for the lifting cable 10 and/or the activating cable 16, and optionally also of corresponding power supply lines 18.

Figure 32:
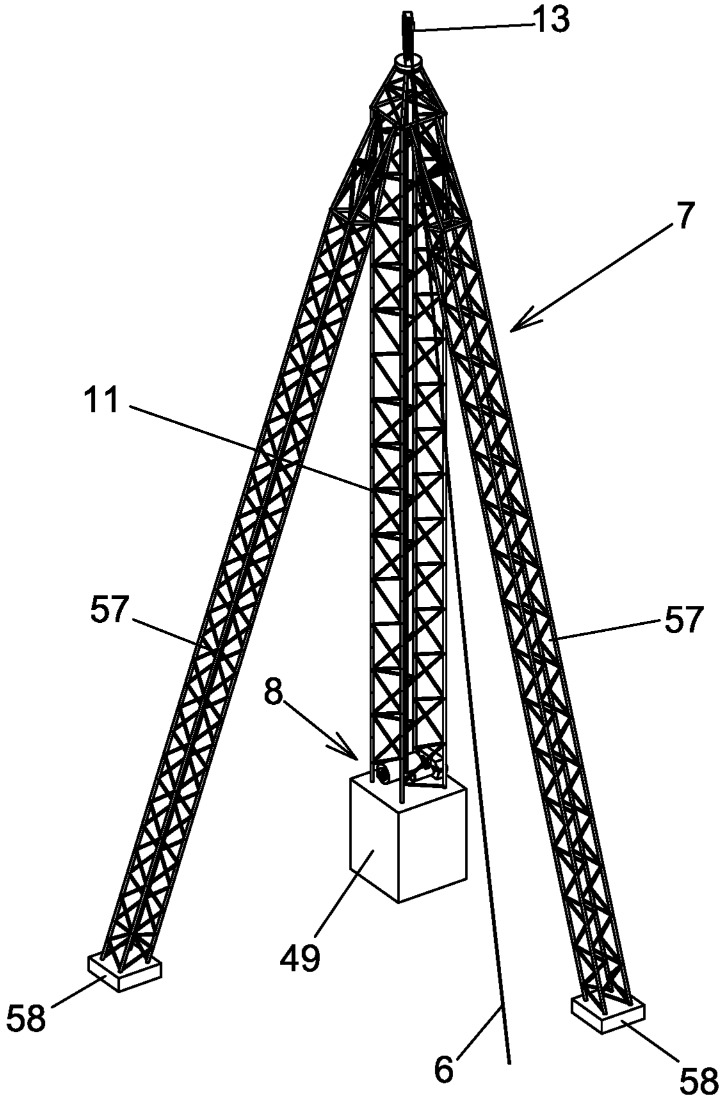

In order for the suspension devices 7 to be fastened in the hard ground, said suspension devices 7 can in principle of course be fixedly connected to said hard ground, for example by way of corresponding foundations or the like. In particular in such load transport systems 1 that are only required for a specific period at one location, it is however also favorable to provide solutions in which the suspension devices 7 only have to be anchored to a minor extent in the hard ground, if at all. FIG. 32 shows a further example to this end. This suspension device 7 has two compression members 57 which are embodied in the form of lattice masts and by way of their respective pressure introduction base 58 have to be freely set up on the hard ground or have to be fastened so as to be secured against slippage only to a minor extent. The rear mast 11 of this suspension device 7 in FIG. 32 serves purely as a tie bar 48. In order to be able to absorb the required tensile forces, the mast 11 is connected to a base 49, the weight of the latter being sufficiently high to readily absorb the arising tensile forces without additional anchoring in the hard ground. In the context of improved portability, the socket 49 can also be a hollow member which on-site is filled with a liquid such as, for example, water, or other materials, for example bulk material, for providing the necessary weight. Of course, a corresponding concrete base or the like can also be used instead of said hollow member.

LIST OF REFERENCE SIGNS

1 Load transport system
2 Load
3 Working space
4 Load carrier
5 Load receiving device
6 Positioning cable
7 Suspension device
8 Positioning cable winch
9 Lifting cable winch
10 Lifting cable
11 Mast
12 Tower
13 Return pulley
14 Return pulley
15 Actuator
16 Activating cable
17 Deflection pulley
18 Power supply line
19 Drive motor
20 Multi-cable suspension
21 Cable connector
22 Pivot axis
23 Pivot axis
24 Pivot axis
25 Pivot axis
26 Support beam
27 Single-cable suspension
28 Further multi-cable suspension
29 Further cable connector
30 Axle pin
31 Axle pin
32 Axle pin
33 Guide
34 Common axle pin
35 Surface
36 Vertical plane
37 Further deflection pulley
38 Lifting cable fixing
39 Common intersection point
40 Yoke
41 Grab shovel
42 Roller
43 Uncoupling mechanism
44 Strut
45 Crossmember
46 Pivot plate
47 Drive motor
48 Tie bar
49 Base
50 Pivot axis
51 Pivot axis
52 Pivot axis
53 Transmission
54 Lantern gear
55 Pinion
56 Pin
57 Compression member
58 Pressure-introduction face
59 Further return pulley
60 Pivot axis
61 Further return pulley
62 Cable drum
63 Axle pin
64 Yoke

The invention claimed is:

1. A load transport system for transporting a load in a working space, the load transport system comprising:

a load carrier;

at least one load receiving device fastened to the load carrier for receiving the load;

at least three positioning cables;

at least three suspension devices that are separately locatable and disposed so as to be mutually spaced apart, each of the suspension devices is independently anchored to hard ground, and each of the suspension devices has at least one positioning cable winch for winding and unwinding one of the positioning cables;

the load carrier is suspended from the suspension devices by the positioning cables;

the load carrier and the load receiving device fastened thereto are relocatable at least one of in or above the working space by activating the positioning cable winches;

the load carrier has at least one multi-cable suspension by which at least two of the positioning cables are in each case connected to the load carrier with one cable connector;

each of the cable connectors is pivotably mounted about at least two pivot axes that are aligned to be mutually orthogonal on the multi-cable suspension, and all of the pivot axes of the cable connectors intersect in a common intersection point of the multi-cable suspension;

wherein the load carrier has an elongate support beam, and the multi-cable suspension is disposed on the support beam; and the load carrier has a single-cable suspension by which a single other one of the positioning cables is connected to the load carrier, and the single-cable suspension is disposed on the support beam spaced apart from the multi-cable suspension.

2. The load transport system according to claim 1, wherein all of the positioning cables are in each case connected to the load carrier by the multi-cable suspension via respective ones of the cable connectors, and each of the cable connectors is mounted on the multi-cable suspension so as to be pivotable about the at least two pivot axes aligned so as to be mutually orthogonal, and all of the pivot axes of the cable connectors intersect in the common intersection point of the multi-cable suspension.

3. The load transport system according to claim 1, wherein the multi-cable suspension is disposed on one end of the support beam.

4. The load transport system according to claim 1, wherein the single-cable suspension is disposed on an end of the support beam that is opposite an end on which the multi-cable suspension is disposed.

5. The load transport system according to claim 1, wherein the cable connectors are in each case configured as at least one of elongate or inherently rigid members.

6. The load transport system according to claim 1, wherein the respective positioning cables are each fastened to a first end of the respective cable connector, and the cable connector is pivotably mounted on the multi-cable suspension by a second end the respective cable connector that is opposite the first end.

7. The load transport system according to claim 1, wherein at least two of the cable connectors are mounted on the multi-cable suspension using at least two, mutually orthogonal, axle pins so as to be pivotable about the at least two pivot axes aligned so as to be mutually orthogonal.

8. The load transport system according to claim 7, wherein the respective cable connector on a first one of the axle pins is mounted so as to be pivotable about a first one of the pivot axes, and the first one of the axle pins is mounted by a second one of the axle pins so as to be pivotable about a second one of the pivot axes.

9. The load transport system according to claim 1, wherein at least one of the suspension devices comprises a mast or tower that is separate from other ones of the suspension devices.

10. A load transport system for transporting a load in a working space, the load transport system comprising:

a load carrier;

at least one load receiving device fastened to the load carrier for receiving the load;

at least three positioning cables;

at least three suspension devices that are separately locatable and disposed so as to be mutually spaced apart, each of the suspension devices is independently anchored to hard ground, and each of the suspension devices has at least one positioning cable winch for winding and unwinding one of the positioning cables;

the load carrier is suspended from the suspension devices by the positioning cables;

the load carrier and the load receiving device fastened thereto are relocatable at least one of in or above the working space by activating the positioning cable winches;

the load carrier has at least one multi-cable suspension by which at least two of the positioning cables are in each case connected to the load carrier with one cable connector;

each of the cable connectors is pivotably mounted about at least two pivot axes that are aligned to be mutually orthogonal on the multi-cable suspension, and all of the pivot axes of the cable connectors intersect in a common intersection point of the multi-cable suspension;

wherein the load carrier has an elongate support beam, and the multi-cable suspension is disposed on the support beam; and the load carrier has at least one further multi-cable suspension by which at least two other ones of the positioning cables are connected to the load carrier, and the multi-cable suspensions are disposed mutually spaced apart on the support beam.

11. The load transport system according to claim 10, wherein the multi-cable suspensions are disposed on mutually opposite ends of the support beam.

12. The load transport system according to claim 10, wherein the at least two other ones of the positioning cables are in each case connected to the load carrier by the further multi-cable suspension via respective further ones of the cable connectors, wherein each of the further cable connectors is mounted on the further multi-cable suspension so as to be pivotable about at least two pivot axes aligned so as to be mutually orthogonal, and all of the pivot axes of the further cable connectors intersect in a common intersection point of the further multi-cable suspension.

13. A load transport system for transporting a load in a working space, the load transport system comprising:

a load carrier;

at least one load receiving device fastened to the load carrier for receiving the load;

at least three positioning cables;

at least three suspension devices that are separately locatable and disposed so as to be mutually spaced apart, each of the suspension devices is independently anchored to hard ground, and each of the suspension devices has at least one positioning cable winch for winding and unwinding one of the positioning cables;

the load carrier is suspended from the suspension devices by the positioning cables;

the load carrier and the load receiving device fastened thereto are relocatable at least one of in or above the working space by activating the positioning cable winches;

the load carrier has at least one multi-cable suspension by which at least two of the positioning cables are in each case connected to the load carrier with one cable connector;

each of the cable connectors is pivotably mounted about at least two pivot axes that are aligned to be mutually orthogonal on the multi-cable suspension, and all of the pivot axes of the cable connectors intersect in a common intersection point of the multi-cable suspension; and the multi-cable suspension for each of the cable connectors pivotably mounted thereon has a guide having an arcuate segment shape, on which the respective cable connector is guided for pivoting about a first one of the orthogonal pivot axes, and the guides in the arcuate segment shape are pivotable about a common axle pin for pivoting the respective cable connectors about a second one of the pivot axes aligned so as to be mutually orthogonal.

14. A load transport system for transporting a load in a working space, the load transport system comprising:

a load carrier;

at least one load receiving device fastened to the load carrier for receiving the load;

at least three positioning cables;

at least three suspension devices that are separately locatable and disposed so as to be mutually spaced apart, each of the suspension devices is independently anchored to hard ground, and each of the suspension devices has at least one positioning cable winch for winding and unwinding one of the positioning cables;

the load carrier is suspended from the suspension devices by the positioning cables;

the load carrier and the load receiving device fastened thereto are relocatable at least one of in or above the working space by activating the positioning cable winches;

the load carrier has at least one multi-cable suspension by which at least two of the positioning cables are in each case connected to the load carrier with one cable connector;

each of the cable connectors is pivotably mounted about at least two pivot axes that are aligned to be mutually orthogonal on the multi-cable suspension, and all of the pivot axes of the cable connectors intersect in a common intersection point of the multi-cable suspension; and a lifting cable winch and a lifting cable, the lifting cable is windable onto and unwindable from the lifting cable winch, and the load receiving device is suspended from the load carrier and is adapted to be lifted and lowered relative to the load carrier by the lifting cable.

* * * * *